(12) United States Patent
Roger et al.

(10) Patent No.: US 9,983,009 B2
(45) Date of Patent: May 29, 2018

(54) DEVICE AND METHOD FOR CALCULATING ESTIMATED NAVIGATION PERFORMANCE PREDICTION

(71) Applicant: THALES, Courbevoie (FR)

(72) Inventors: Michel Roger, Toulouse (FR); Christophe Pierre, Toulouse (FR); Hervé Goutelard, Toulouse (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/642,238

(22) Filed: Jul. 5, 2017

(65) Prior Publication Data

US 2018/0010916 A1   Jan. 11, 2018

(30) Foreign Application Priority Data

Jul. 7, 2016   (FR) ..................... 16 01058

(51) Int. Cl.
| | |
|---|---|
| *G01C 21/20* | (2006.01) |
| *G01S 19/49* | (2010.01) |
| *G01C 21/16* | (2006.01) |
| *G01C 23/00* | (2006.01) |
| *G08G 5/00* | (2006.01) |
| *G01S 19/48* | (2010.01) |
| *G05D 1/02* | (2006.01) |

(52) U.S. Cl.
CPC .............. *G01C 21/20* (2013.01); *G01C 21/16* (2013.01); *G01C 23/00* (2013.01); *G01C 23/005* (2013.01); *G01S 19/48* (2013.01); *G01S 19/49* (2013.01); *G08G 5/003* (2013.01); *G05D 1/02* (2013.01)

(58) Field of Classification Search
CPC ........ G01C 21/20; G01C 20/16; G01C 23/00; G01S 19/4849; G08G 6/003; G01D 1/02
USPC ......................................................... 701/439
See application file for complete search history.

(56) References Cited

U.S. PATENT DOCUMENTS

| | | | | |
|---|---|---|---|---|
| 9,464,901 | B1 * | 10/2016 | Bell ....................... | G01C 21/00 |
| 2005/0283281 | A1 * | 12/2005 | Hartmann .............. | G01C 21/00 |
| | | | | 701/4 |
| 2015/0262490 | A1 * | 9/2015 | Deker .................. | G08G 5/0052 |
| | | | | 701/3 |

* cited by examiner

Primary Examiner — Tan Q Nguyen

(74) Attorney, Agent, or Firm — Baker & Hostetler LLP

(57) ABSTRACT

A method is provided for calculating the estimated navigation performance prediction for a trajectory associated with a list of segments of a flight plan. A method for displaying the navigation performance in a corridor trajectory so as to guarantee compliance with the navigation performance requirements while offering immediate viewing of the navigation latitude in a corridor is also provided.

22 Claims, 18 Drawing Sheets

DEVICE AND METHOD FOR CALCULATING ESTIMATED NAVIGATION PERFORMANCE PREDICTION

CROSS-REFERENCE TO RELATED APPLICATIONS

This application claims priority to foreign French patent application No. FR 1601058, filed on Jul. 7, 2016, the disclosure of which is incorporated by reference in its entirety.

FIELD OF THE INVENTION

The invention relates to the field of flight management systems, and more particularly that of aiding the piloting of aircraft through the early calculation of navigation performance.

SUMMARY OF THE INVENTION

So-called Performance-Based Navigation (PBN) is a flight scheme which was defined by the ICAO international civil aviation organization in 1998 in order to optimize the use of airspace faced with the continual growth in air traffic. The PBN scheme makes it possible to define conditions to be complied with in terms of integrity, availability, functionality, accuracy and continuity. These conditions are manifested by requirements in terms of Required Navigation Performance (RNP) and in terms of estimated navigation performance EPE (Estimated Position Error) or EPU (Estimated Position Uncertainty).

The required navigation performance RNP is defined for flight portions. As illustrated in FIG. 1, the RNP varies depending on whether the aircraft is on a flight portion of 'Oceanic' or 'Enroute' or 'Terminal Area' or else 'Approach' type. Thus a procedure with a certain required performance refers to a specific block of space. The required performance level is manifested by the width of a corridor according to the block of space. For example, an oceanic block of space can have a corridor of width ranging from 4 to 10 Nm where the symbol Nm corresponds to a nautical mile and 1 nautical mile is equivalent to 1852 m.

In the approach phase when approaching an airport where many aircraft coexist in a reduced space, the required performance level translated into width of the corridor generally equals 1 Nm at the start of approach, drops to 0.5 Nm for non-precision approaches, 0.3 Nm for precision approaches and to 0.1 Nm for so-called 'RNP AR' special approaches. The variability of the required performance level makes it possible to define a three-dimensional trajectory composed of straight lines and curves, in an environment with high traffic density, around noise sensitive zones or across difficult terrain. The required performance level can be defined in a configuration file of the flight management system, manually by the pilot or called from a database present in the flight management system. It can also be defined by default depending on whether the space overflown by the aircraft is of oceanic, enroute or airport type, for example.

In order to be able to follow the requirements of the RNP procedure, the aircraft's navigation means must be capable of calculating the position of the aircraft according to the required performance over the space overflown. Thus, a procedure with a certain required performance means that the aircraft's navigation systems must be capable of guaranteeing that the position of the aircraft is inside a circle of radius xx Nm. For example, for a procedure having an RNP required performance of 5 Nm, the aircraft's navigation system must be capable of calculating the position of the aircraft in a circle of radius 5 Nm. More precisely as illustrated in FIG. 2, the navigation system must guarantee that the aircraft shall not exit a corridor of width 10 Nm (2×RNP: accuracy limit) for 95% of the flight time, and guarantee that the aircraft will never cross the boundary of a corridor of width 20 Nm (4×RNP: containment limit).

The precision of the position calculation can vary along the flight. Indeed, the outside satellite navigation devices of GPS Global Positioning System type have different coverage levels according to the geographical zone considered. The same holds for radio navigation means. As regards inertial means, they suffer from the problem of inertial drift inherent in these systems.

In a conventional manner, the error in calculating the aircraft horizontal position called TSE "Total System Error" represented in FIG. 3 is the root of the sum of the squares of 3 components, expressed by the following equation:

$$TSE = \sqrt{(FTE)^2 + (NSE)^2 + (PDE)^2}$$

where:
  NSE "Navigation System Error" represents the aeroplane location error, also called PEE for "Position Estimation Error". This error characterizes the error in the calculation of the aeroplane position on the basis of radio position, inertial, or satellite sensors. It is often represented in the form of a circle around the aeroplane.
  PDE "Path Definition Error" represents the aeroplane trajectory error. This error is considered to be negligible, since it is associated with a very improbable error of coding of the navigation database. This error becomes still lower for navigation systems using a geodesic reference model of WGS84 type.
  FTE for "Flight Test Error" represents the aeroplane guidance error, also called PSE for "Path Steering Error". This error is related to the aeroplane's guidance mode and its source consists of three guidance states ranked from the least precise, corresponding to the most significant error, to the best:
    manual guidance without aid to follow the trajectory,
    manual guidance with following of the flight directing orders,
    automatic guidance with the automatic pilot engaged for following the trajectory.

In FIG. 3, the arrow "DesP" for "desired path" corresponds to the desired trajectory, and the dotted arrow "DefP" for "defined path" corresponds to the calculated trajectory.

For the TSE, it is a first component (PDE) which in practice is considered negligible, a second component (FTE) which has 3 fixed values and which applies only to the active flight segment, that which the aircraft is in the process of following, and a third component (NSE) which is related to the measurements of the sensors. The latter component can vary along the trajectory since it is dependent on the performance of the sensors available around the position of the aircraft which moves around.

The error in calculating the position of the aircraft originates from the systems performing the calculation, in general the navigation system which is referred to by the terminology "Flight Management System" or FMS and which places the route to be followed at the disposal of the flight personnel and at the disposal of the other embedded systems on board. This FMS system also affords an aid to navigation, by displaying information useful to the pilots, or else by communicating guidance directives to an automatic piloting system. On certain aircraft, such as the A350, it is the ADIRU system which operates the aircraft location function. These systems provide an estimation of the calculation error termed (EPE) for "Estimation Position Error", sometimes called (EPU) for "Estimation Position Uncertainty", two items which represent the same piece of information. This piece of information is thus representative of an estimated performance level relative to a required performance level. FIG. 4 illustrates, according to a known display, the estimated performance prediction under the EPU information varying according to the flight segments. The navigation system must guarantee that the position of the aircraft is inside a circle of radius 'xx', this radius characterizing the uncertainty EPU in the position calculation. This circle, as a function of the speed of the aeroplane, takes the form of an ovoid so as to take account of the possible reduction in the tolerance required when passing from one flight segment to the next, on exiting a turn when transitioning between two flight segments.

Thus, at present the knowledge of the required navigation performance remains limited to the current flight segment, or indeed to near the end of the next segment, whilst the value of the required navigation performance can vary along the whole flight plan. The pilot does not benefit in any way from advance knowledge of a change in the required navigation performance.

In an analogous manner, the estimated navigation performance is dependent on location sensors whose availability varies along the flight, and the calculation of the value of the estimated navigation performance is valid today only for the current flight segment followed by the aircraft. Thus, knowledge of the estimated navigation performance remains limited to the current position of the aircraft and does not allow the pilot to anticipate with regard to non-compliance with the required performance.

Thus, the information available to the operator remains the values of required navigation performance and of estimated navigation performance for the current flight segment such as is illustrated in FIGS. 5a and 5b. FIG. 5a represents a page of a screen of a flight management system, which screen is not accessible by the pilot in the "head-up" position and access to which requires the pilot to enter the menu of the management system so as to make this page appear on a screen. In the example of this page, the title "APPROACH" indicates that the information provided relates to an airport approach phase, for example. At the bottom left, the term "REQUIRED" is displayed with a numerical value of 1.0 NM which indicates the performance level required by the RNP procedure. At the bottom right, the term "ESTIMATED" is displayed with a numerical value of 0.60 NM which indicates the estimated performance level. In the example, the requirement of the RNP procedure is satisfied, the level of estimated navigation performance being less than the level of required navigation performance. The term "HIGH" associated with the term "ACCUR" represents a qualitative indication of the integrity level of the navigation calculations for the pilot and shows that the dependability level is considered to be high.

Moreover, the operator maintains the aircraft on a calculated trajectory which is termed a "wire" trajectory such as is illustrated in FIG. 5b. FIG. 5b represents a page of a navigation screen of the flight management system embedded aboard an aircraft which shows the trajectory to be followed by the aircraft, is generally easily accessible in the "head-up" position by the pilot of the aircraft, not requiring any manoeuvre to gain access thereto. The current position of the aircraft is indicated by an aircraft-shaped symbol, represented at the centre of three concentric circles of increasing radius. The trajectory of the aircraft is indicated by an axis or "wire" passing through the current position of the aircraft, a first and a second waypoint (CI27R, FI27R). The current position and the first waypoint define a first current trajectory portion, a trajectory portion commonly being called a segment or "leg" in English. The first and second waypoints define a second trajectory portion.

The aircraft's systems must comply with and not exceed the required navigation performance which is expressed as width Nm of a corridor. However, with the wire display, the operator does not have any information about the navigation latitude in the corridor which is defined by the required navigation performance, and if an obstacle lies in the corridor, the pilot will see it only at the last moment and the operation will require an emergency authorization request to the ground operator.

Thus at present, the navigation systems deliver a level of required navigation performance and a level of estimated navigation performance which are limited to the current flight segment or at best to the next segment for the current position of the aircraft. Moreover, the known navigation systems do not afford the operator the "freedom" to navigate in a defined corridor while complying with the RNP procedure.

An aim of the invention is to alleviate the drawbacks of the known systems.

SUMMARY OF THE INVENTION

An object of the present invention is to propose a device and a method to calculate the estimated navigation performance prediction for a trajectory associated with a list of segments of a flight plan.

Another object of the invention is to propose a device and a method to transform a wire trajectory into a corridor trajectory, making it possible to guarantee compliance with the PBN navigation performance requirements as long as the aeroplane does not exit the corridor trajectory.

Advantageously, the device of the invention provides an aid to the piloting of an aircraft within the framework of PBN procedures by offering a capability to predict the estimation of navigation performance over a list of segments.

Advantageously, the device of the invention provides in a simple manner a corridor trajectory piece of information, allowing the operator of the aircraft better control of the aeroplane's trajectory and of the expected and available performance, by giving him easy access to the corridor wherein the performance is guaranteed and to the limits not to be exceeded. Through the immediate viewing of the navigation latitude in a corridor, the avoidance of an obstacle becomes an operation which is easy for the pilot to undertake, without requesting prior authorization or with a very early request since the operator or the pilot by virtue of the knowledge of the estimated performance, complies with the safety which is displayed to him in an obvious manner by the corridor trajectory.

To obtain the results sought, methods, devices and a computer program product are described.

In particular, a method, operated by an aircraft computing platform, for the calculation of estimated navigation performance prediction for a trajectory of an aircraft, comprises the steps of:
  receiving a list of segments comprising all of the segments of a flight plan with a prediction of a transit time associated with each segment;

for each segment of the list:
  identifying the positioning systems outside the aircraft that are available in the geographical zone of the said segment;
  determining the performance values of the positioning systems identified and selecting the outside positioning system exhibiting the lowest navigation performance calculation error for the position of the said segment and the said predicted transit time; and
  calculating an estimated navigation performance prediction, on the basis of data arising from the outside positioning system selected; and
  updating the list of segments with the estimated navigation performance prediction associated with each segment.

In a preferential mode, the step of identifying the positioning systems consists in identifying all of the satellite, beacon and inertial positioning systems available for each segment. The step of calculating the estimated navigation performance prediction consists in determining whether a satellite prediction for each segment is precise and available, and, if so, calculating the estimated navigation performance prediction on the basis of the satellite data.

According to a variant, if the satellite prediction for a segment is not precise or unavailable, the method compares the performance values of the beacon and inertial systems and calculates the estimated navigation performance prediction on the basis of the data of the beacon or inertial positioning system exhibiting the lowest navigation performance calculation error for the said segment.

In a variant, the calculation of the estimated navigation performance prediction, when it is done on the basis of the data of the inertial system, takes into account the drift of the inertial system. In an alternative, the calculation of the estimated navigation performance prediction, when it is done on the basis of the data of the beacon system, takes into account the performance of the beacons available in the geographical zone of the said segment.

Advantageously, the values of navigation performance of the satellite positioning systems arise from a satellite receiver comprising a "RAIM" functionality embedded aboard the aircraft.

In one embodiment, a segment can be cut up into sub-segments to perform the prediction calculation, the cutting being able to be done according to fixed sub-segment lengths or by considering the maximum range of the satellite predictions.

Advantageously, the method can be executed for a calculation of estimated horizontal navigation performance prediction and/or for a calculation of estimated vertical navigation performance prediction.

Still advantageously, the method can be re-executed automatically if transit time predictions or the flight plan change.

The invention also relates to a device for the calculation of estimated navigation performance prediction for a trajectory of an aircraft, the device comprising:
  means for receiving a list of segments comprising all of the segments of a flight plan with a prediction of a transit time associated with each segment;
  means adapted, for each segment of the list:
    to identify the positioning systems outside the aircraft that are available in the geographical zone of the said segment;
    to determine the performance values of the positioning systems identified and select the outside positioning system exhibiting the best navigation performance value for the position of the said segment and the said predicted transit time; and
    to calculate an estimated navigation performance prediction, on the basis of data arising from the outside positioning system selected; and
  means for updating the list of segments with the estimated navigation performance prediction associated with each segment.

Advantageously, the device comprises means able to operate the steps of the method. In one embodiment, the device is integrated into the flight management system (FMS) of the aircraft or alternatively as component of a computer of EFB type embedded on board.

The invention also relates to a tangible non-transitory computer program product, comprising code instructions that perform the steps of the method when the tangible non-transitory program is executed on a computer.

In one embodiment, the method for calculating the predictions of estimated navigation performance can be executed so as to allow display thereof. The invention also relates to a method of displaying predictions of estimated and required navigation performance for a trajectory of an aircraft, the method being operated by an aircraft computing platform and comprises the steps of:
  calculating predictions of estimated navigation performance for a list of segments of a flight plan, according to the steps of the claimed method;
  calculating, for the same list of segments, predictions of required navigation performance; and
  representing the said predictions of estimated and required navigation performance graphically on a display means.

In one embodiment, the step of calculating the predictions of required navigation performance comprises the steps of:
  receiving a list of segments of a flight plan;
  for each segment of the list:
    identifying all the contingencies constituting navigation performance constraints;
    determining and selecting the most constraining contingency for the segment;
    calculating a prediction of required navigation performance, as a function of data arising from the selected contingency; and
  updating the list of segments with the prediction of required navigation performance associated with each segment.

In one embodiment, the graphical representation consists in displaying the said predictions of estimated and required navigation performance superimposed on a wire trajectory.

In a variant, before the display step, the method makes it possible, for each segment, to subtract the predictions of estimated navigation performance from the predictions of the performance of required navigation, so as to construct a corridor trajectory, and the graphical representation consists in displaying the said predictions of estimated and required navigation performance as a function of the corridor.

According to one embodiment, the display step consists in displaying a wire trajectory for the segments having a greater estimated navigation performance prediction than the required navigation performance prediction.

In a variant, the graphical representation consists in representing the navigation latitude in contrast on the corridor trajectory.

The invention also covers a device for displaying predictions of estimated and required navigation performance for a trajectory of an aircraft, the display device comprises a display means and calculation means adapted to to calculate predictions of estimated and required navigation performance, the predictions of estimated navigation performance are calculated according to the steps of the claimed calculation method, and the device further comprises means for representing the predictions of estimated and required navigation performance graphically on the display means. The display means can be a screen of the cockpit of the aircraft, such as a "Navigation Display" (ND) or a "Primary Flight Display" (PFD) screen.

BRIEF DESCRIPTION OF THE DRAWINGS

Various aspects and advantages of the invention will appear in support of the description of one preferred, but non-limiting, mode of implementation of the invention, with reference to the figures below.

DETAILED DESCRIPTION

Figure 1:
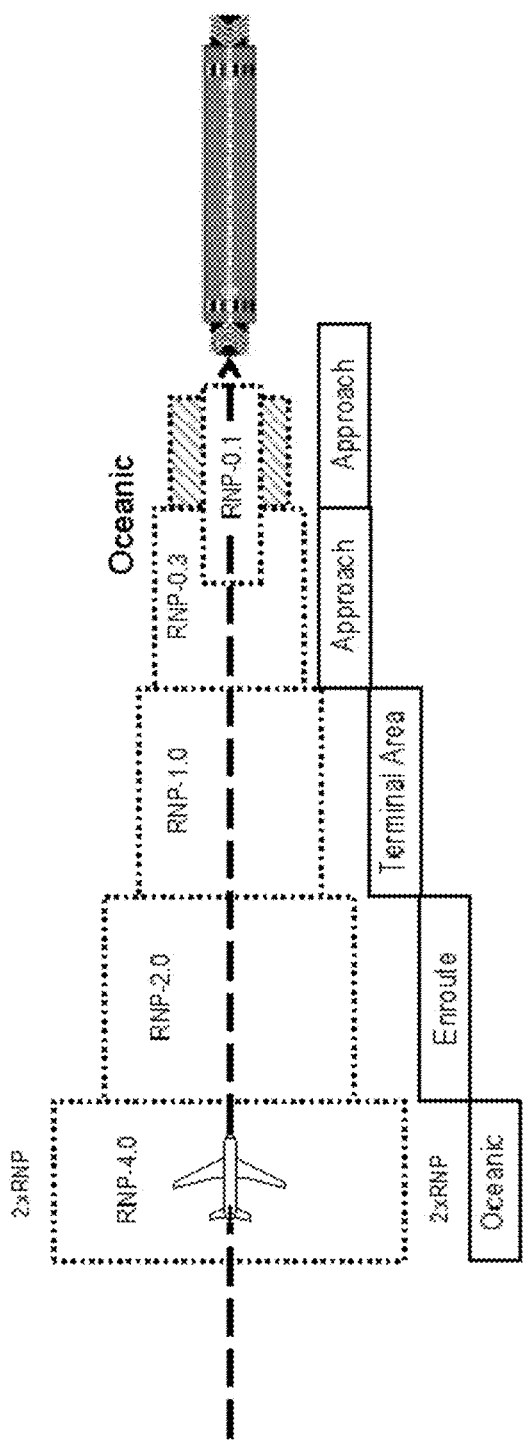
FIG. 1 illustrates an RNP required navigation performance for various flight portions.
Figure 2:
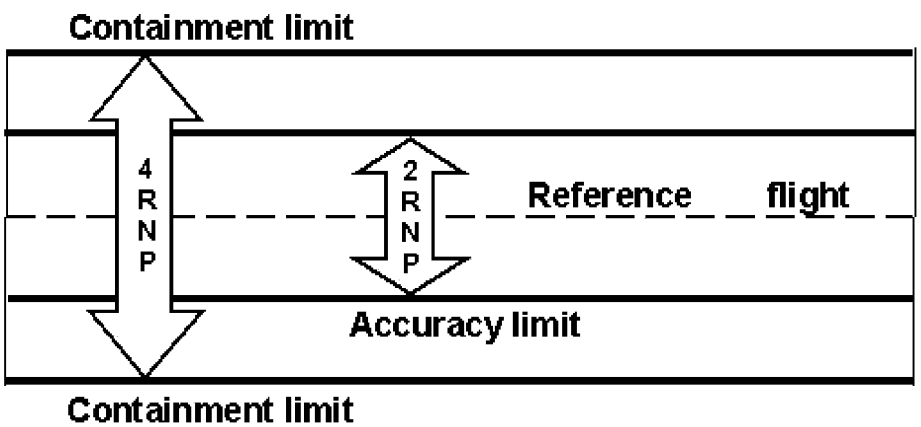
FIG. 2 illustrates the limits of RNP navigation of an aircraft in a corridor.
Figure 3:
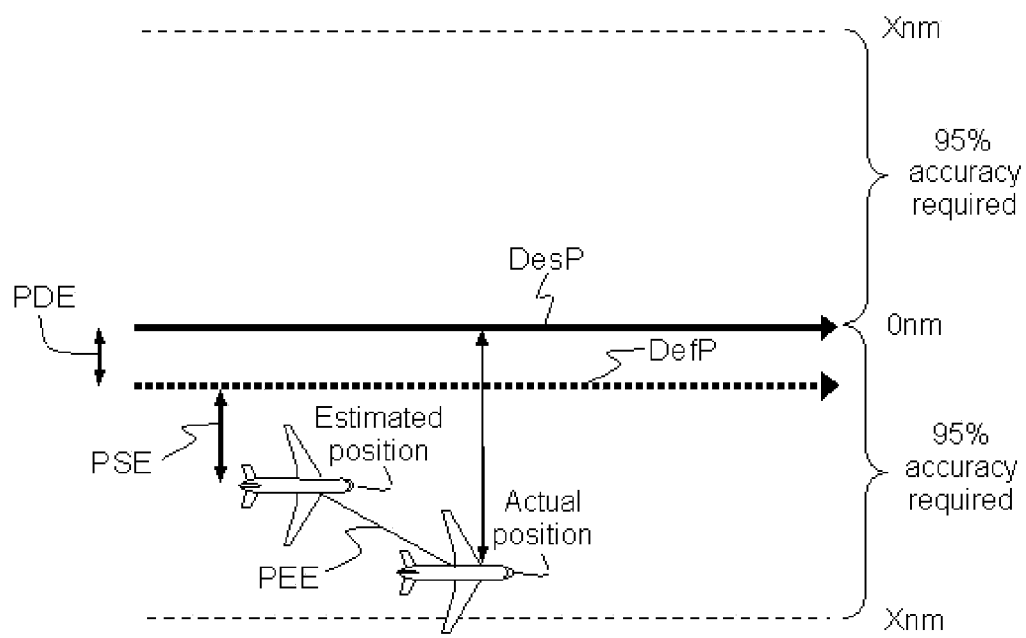
FIG. 3 illustrates the three components of the error in calculating the aircraft horizontal position.
Figures 4A, 4B:
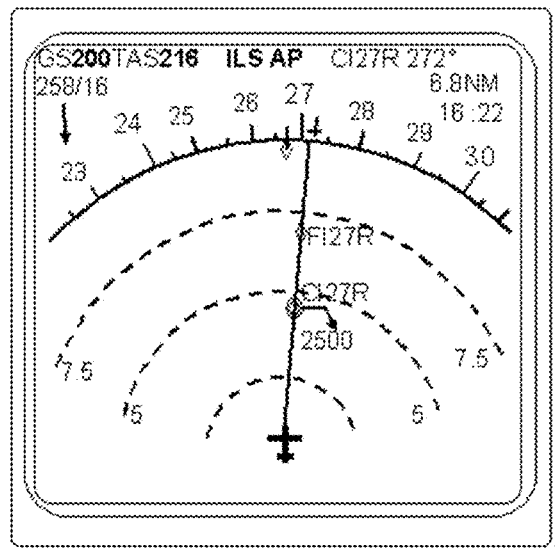
FIGS. 4a and 4b illustrate various pages of the navigation screen of a flight management system, according to the known state of the art.
Figure 5:
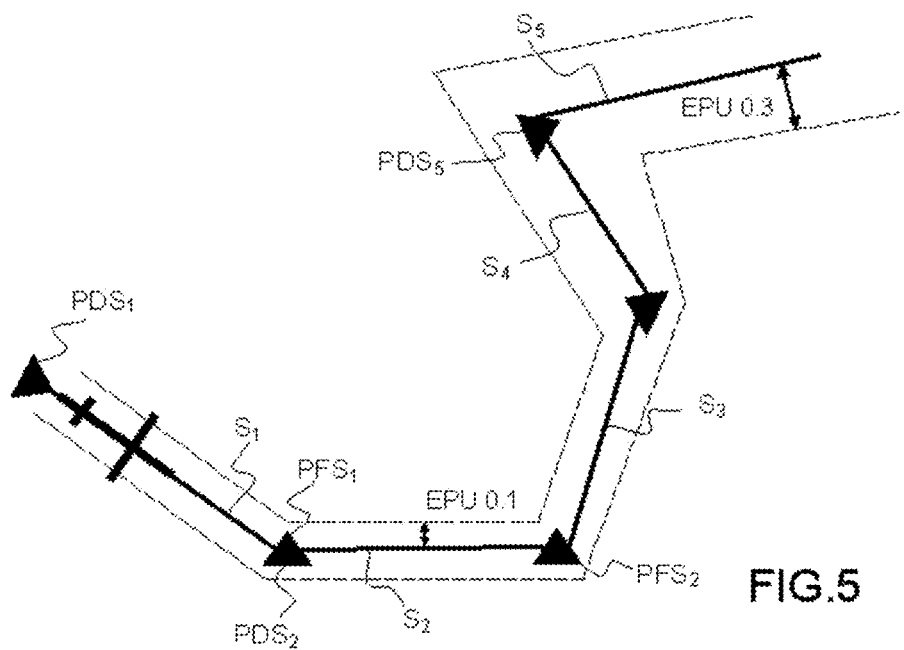
FIG. 5 illustrates a display of the estimated navigation performance prediction for a trajectory associated with a list of segments according to one embodiment of the invention.

FIG. 5 represents an exemplary display according to one embodiment of the invention, of the estimated navigation performance (EPU) prediction for a wire trajectory associated with a list of segments. This display allows the operator to monitor the aircraft navigation performance. A list of segments such as defined in the description is a continuous sequence of segments (S1, S2, . . . , Si, . . . , Sn), the segments being straight or curved, each segment having a start point ($PD_{Si}$) and a final point ($PF_{Si}$) respectively defined by their latitude, longitude and altitude. Moreover, with any segment of a list is associated a transit time when passing over the final point of the segment, and one speaks of a dated list of segments. In the example of FIG. 5, five segments (S1 to S5) of a list of segments Sn are represented. The segment S1 which has start point $PD_{S1}$ and final point $PF_{S1}$ contains the representation of the aircraft in its current position, the segment S2 which has start point $PD_{S2}$ and final point $PF_{S2}$ displays an estimated navigation performance EPU prediction of 0.1 Nm. The segment S5 which has start point $PD_{S5}$ displays an estimated performance prediction of 0.3 Nm. For reasons of simplification, only the EPUs of two segments are represented.

Figure 6:
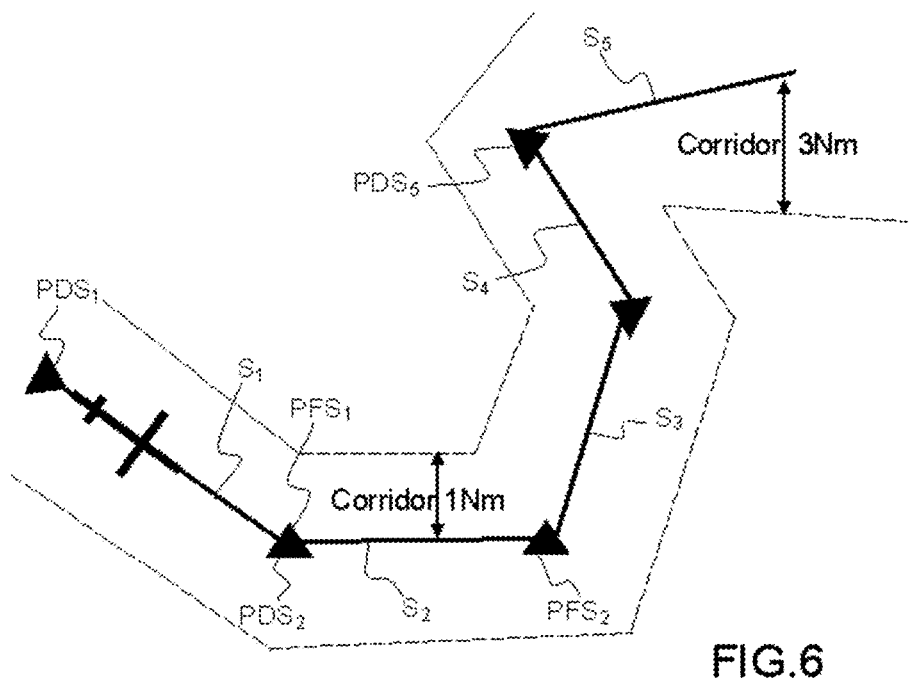
FIG. 6 illustrates a display of the prediction of required navigation performance for a trajectory associated with a list of segments according to one embodiment of the invention.

FIG. 6 represents an exemplary display according to one embodiment of the invention, of the prediction of required navigation performance for a wire trajectory associated with a list of segments, where the list of segments (S1 to S5) is identical to that of FIG. 5. In this representation, the required performance prediction is displayed as half-width of a corridor corresponding to the corridor inside which the aircraft can travel. This display allows the operator to anticipate a more constraining required navigation performance requirement. On the segment S2, this value equals 1 Nm meaning that the aircraft must travel in a corridor of width 2 Nm over this flight portion, and for the segment S5, this value equals 0.3 Nm meaning that the aircraft must travel in a corridor of width 0.6 Nm over this flight portion.

Figure 7:
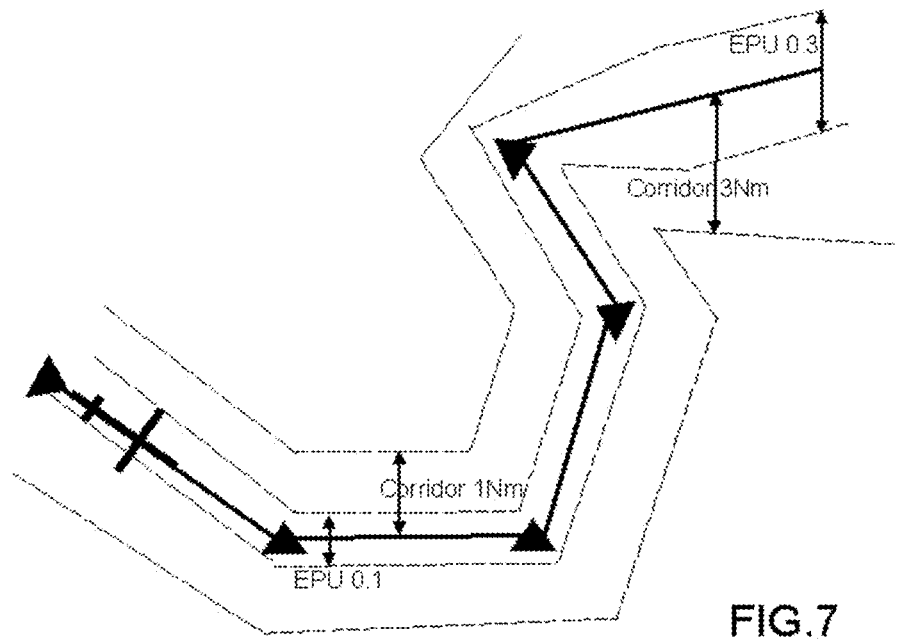
FIG. 7 illustrates a combined display of the predictions of required and estimated navigation performance for a trajectory associated with a list of segments according to one embodiment of the invention.
Figure 8:
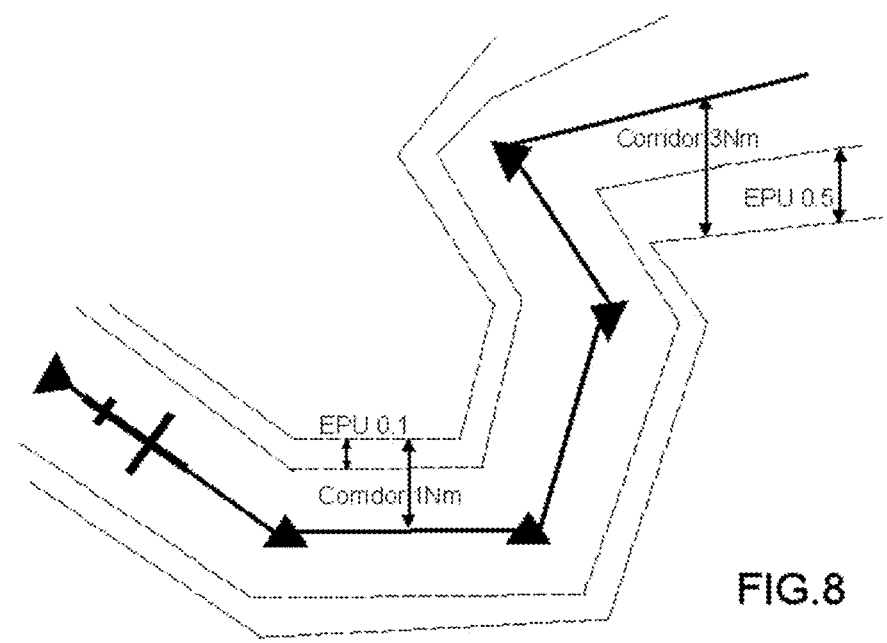
FIG. 8 illustrates a combined display of the predictions of required and estimated navigation performance for a trajectory associated with a list of segments according to another embodiment of the invention.

FIGS. 7 and 8 represent exemplary displays combining predictions of required and estimated navigation performance for a wire trajectory associated with a list of segments, according to various embodiments of the invention. The display of FIG. 7 can be a representation in accordance with the mental representation of an operator with a first corridor relating to the EPU and a second corridor corresponding to the required navigation performance. The display of FIG. 8 allows the operator even in non-managed mode (where the NAV automatic trajectory following mode is not engaged) to know the relative situation of the aircraft with respect to the regulatory limit (the width of the "required" corridor).

Figure 9A:
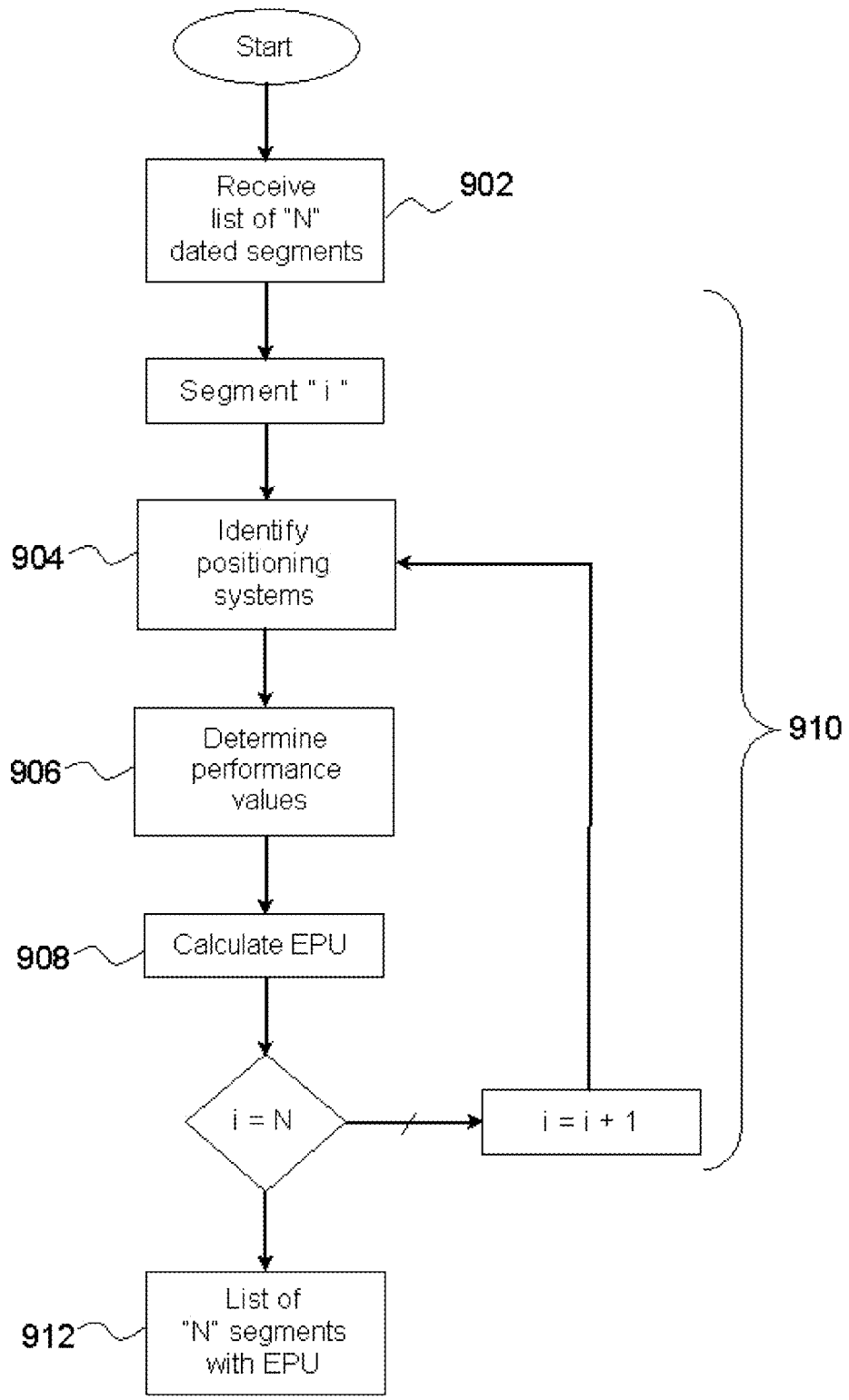
FIG. 9a illustrates a method for calculating the predictions of required navigation performance for a list of segments in an embodiment of the invention.

FIG. 9a illustrates, according to one embodiment of the invention, steps of the method for calculating the predictions of estimated performance for a list of segments of a flight plan.

Figure 10:
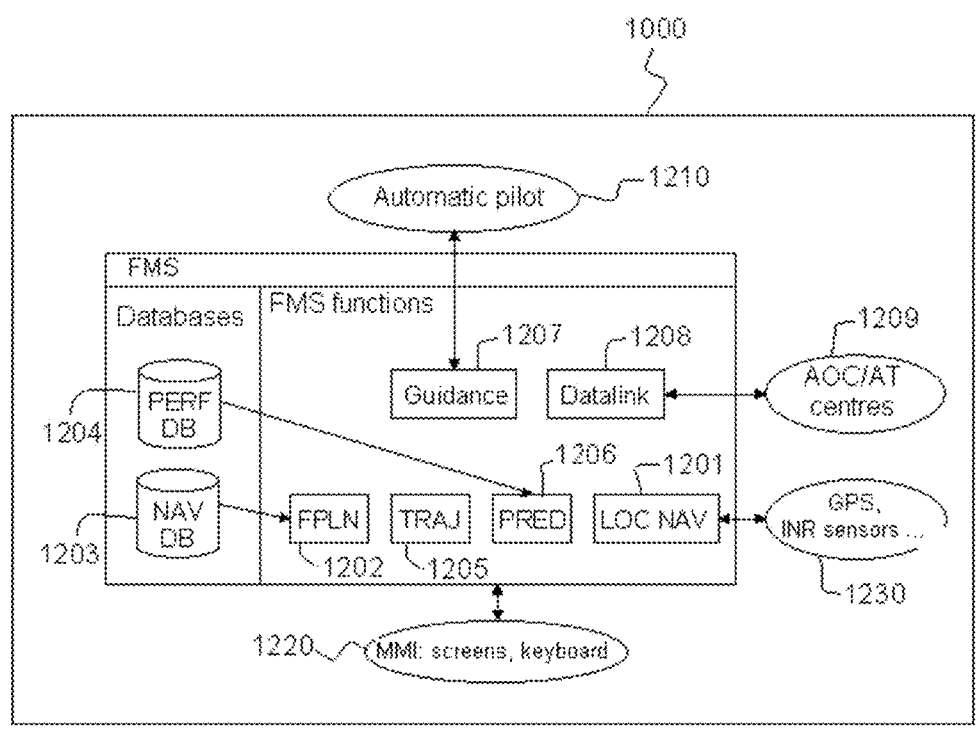
FIG. 10 schematically illustrates the structure and the functions of a flight management system of FMS type adapted to operate the present invention.

The method starts with a step (902) of receiving a dated list of 'N' flight segments for a trajectory associated with a flight plan. With each segment of the flight plan, there is associated a predicted transit time at which the aircraft passes over the said segment. The list of segments is produced by the flight management system. The flight plan data are generally provided by the flight management system (FMS) which has a current flight plan of the aircraft which comprises the various points of the flight plan. FIG. 10 schematically illustrates the structure and the functions of a flight management system of known type (FMS), adapted to implement the means able to operate the method of the invention. A system of FMS type is installed in an aeroplane and has a man-machine interface (1220) comprising input means, for example consisting of a keyboard, and display means, for example consisting of a display screen, or else simply a touch display screen, as well as at least the following functions:

Navigation (LOCNAV) (1201), for performing optimal location of the aircraft as a function of the geolocation means (1230) such as geo-positioning by satellite or GPS, GALILEO, VHF radionavigation beacons, inertial platforms. The methods and the systems described affect or relate mainly to this part of the computer;

Flight plan (FPLN) (1202), for inputting geographical elements forming the "skeleton" of the route to be followed, such as the points imposed by the departure and arrival procedures, the waypoints, the air corridors, commonly called "airways".

Navigation database (NAVDB) (1203), for constructing geographic routes and procedures from data included in the bases relating to the points, beacons, interception or altitude legs, etc.;

Performance database, (PERFDB) (1204), containing the aerodynamic and engine parameters of the aircraft;

Lateral trajectory (TRAJ) (1205), for constructing a continuous trajectory on the basis of the points of the flight plan, complying with the performance of the aircraft and the confinement constraints (RNP);

Predictions (PRED) (1206), for constructing an optimized vertical profile on the lateral and vertical trajectory and giving the estimations of distance, time, altitude, speed, fuel and wind in particular over each point, reupdated at each change of piloting parameter and calculated up to the destination, and which will be displayed to the crew;

Guidance (GUID) (1207), for guiding, in the lateral and vertical planes, the aircraft on its three-dimensional trajectory, while optimizing its velocity, using information computed by the Predictions function (1206). In an aircraft equipped with an automatic piloting device (1210), the latter can exchange information with the guidance module (1207);

Digital datalink (DATALINK) (1208) for exchanging flight information between the Flight plan/Prediction functions and the control centres or other aircraft;

one or more screens, in particular screens termed FMD, ND and VD which are:

The FMD ("Flight Management Display" in English) is an interface, generally a display screen, that may be interactive (for example a touchscreen), adapted to interact with the FMS. For example, it makes it possible to define a route and to trigger the calculation of the flight plan and of the associated trajectory. It also makes it possible to consult the result of the calculation in text form. The ND ("Navigation display" in English) is an interface, generally a display screen, that may be interactive (for example a touchscreen), adapted to consult in two dimensions the lateral trajectory of the aeroplane, viewed from above. Various modes of viewing are available (rose, plan, arc, etc) as well as according to various (configurable) scales. The VD ("Vertical Display" in English) is an interface, generally a display screen, that may be interactive (for example a touchscreen), adapted to consult in two dimensions the vertical profile, i.e. the projection of the trajectory. Just as for the ND, various scales are possible for the VD.

In an alternative embodiment, the device of the invention can be implemented at the level of a computer embedded onboard and separate from the FMS, of "Electronic Flight Bag" (EFB) type, as it is known. The EFB is an electronic device for managing information which aids crews to perform flight management tasks. It is a computing platform which can host specially developed software applications to operate functions such as the calculations of takeoff performance and of weight balancing.

The method makes it possible thereafter (904) to retrieve the performance values for a set of positioning systems outside the aircraft. The principal known positioning systems are ground navigation radio beacons (e.g.: VOR, TACAN, DME, LOC, MLS, etc.), inertial navigation systems (e.g.: IRS, ADIRS, AHRS, etc.) and satellite-based positioning systems (e.g.: GNSS, GPS, GLONASS, etc.). With each type of positioning system is associated a navigation performance.

In the following step (906), the method makes it possible to calculate, for each segment 'i' of the list, an estimated navigation performance prediction, taking into account the position of the segment 'i' considered and the prediction of transit time on passing over this segment, as well as the data of the positioning systems through the inertial platforms, navigation beacons and satellite systems. As detailed further on with reference to FIG. 11, the calculation of the estimated performance prediction (908) is based on an innovative use of the functionalities of the satellite reception systems aboard the aircraft, and of information produced by the various position trackers. Advantageously, the method of the invention makes it possible to compare the information produced by the various positioning systems and to select, for the calculation of the estimated performance prediction, that which offers the best navigation performance for each segment 'i', as a function of the position of the segment and of the predicted transit time.

The output (910) of the method of calculating the estimated navigation performance prediction is the list of the 'N' segments for the whole flight plan associated with the trajectory with, for each segment, the calculated estimated navigation performance prediction (PREDICTED_EPU).

According to one embodiment, the method for calculating the estimated navigation performance prediction over the whole flight plan is performed at regular intervals, if no automatic relaunch event has occurred for a certain duration (15 min for example), so as to take account of satellite faults, navigation beacon faults or other events.

In another embodiment, the method for calculating the estimated navigation performance prediction can be relaunched automatically if the predictions of time of transit on the segments change appreciably for example due to a change of speed, weather phenomena (significant winds).

In another variant, the calculation of the estimated performance prediction can be relaunched subsequent to a relaunch of the calculation of the required performance prediction.

Figure 9B:
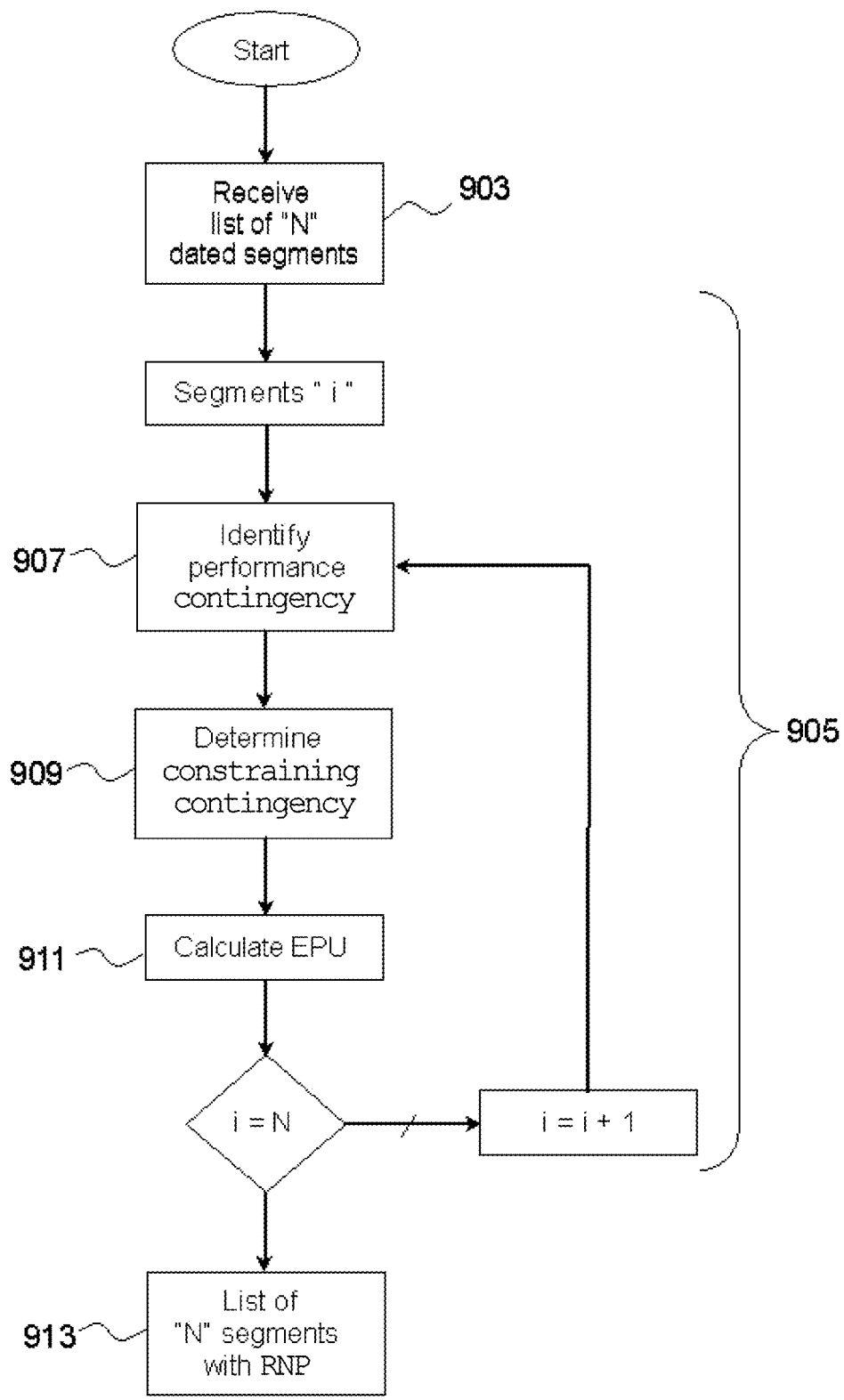
FIG. 9b illustrates the method for calculating the predictions of estimated navigation performance for a list of segments in an embodiment of the invention.

FIG. 9b illustrates, according to one embodiment of the invention, steps of the method for calculating the predictions of required performance for a list of segments of a flight plan. The method starts with a step (903) of receiving a list of 'N' flight segments for a trajectory associated with a flight plan.

In a next step (905) the method makes it possible to calculate, for each segment of the list, a required performance prediction.

For each segment 'i' of the list, the method makes it possible (907) to identify via the information of the navigation database and the operator inputs, all of the constraints of required navigation performance, to select (909) the most constraining contingency, and to calculate (911) a required performance prediction for the segment considered.

Figure 14:
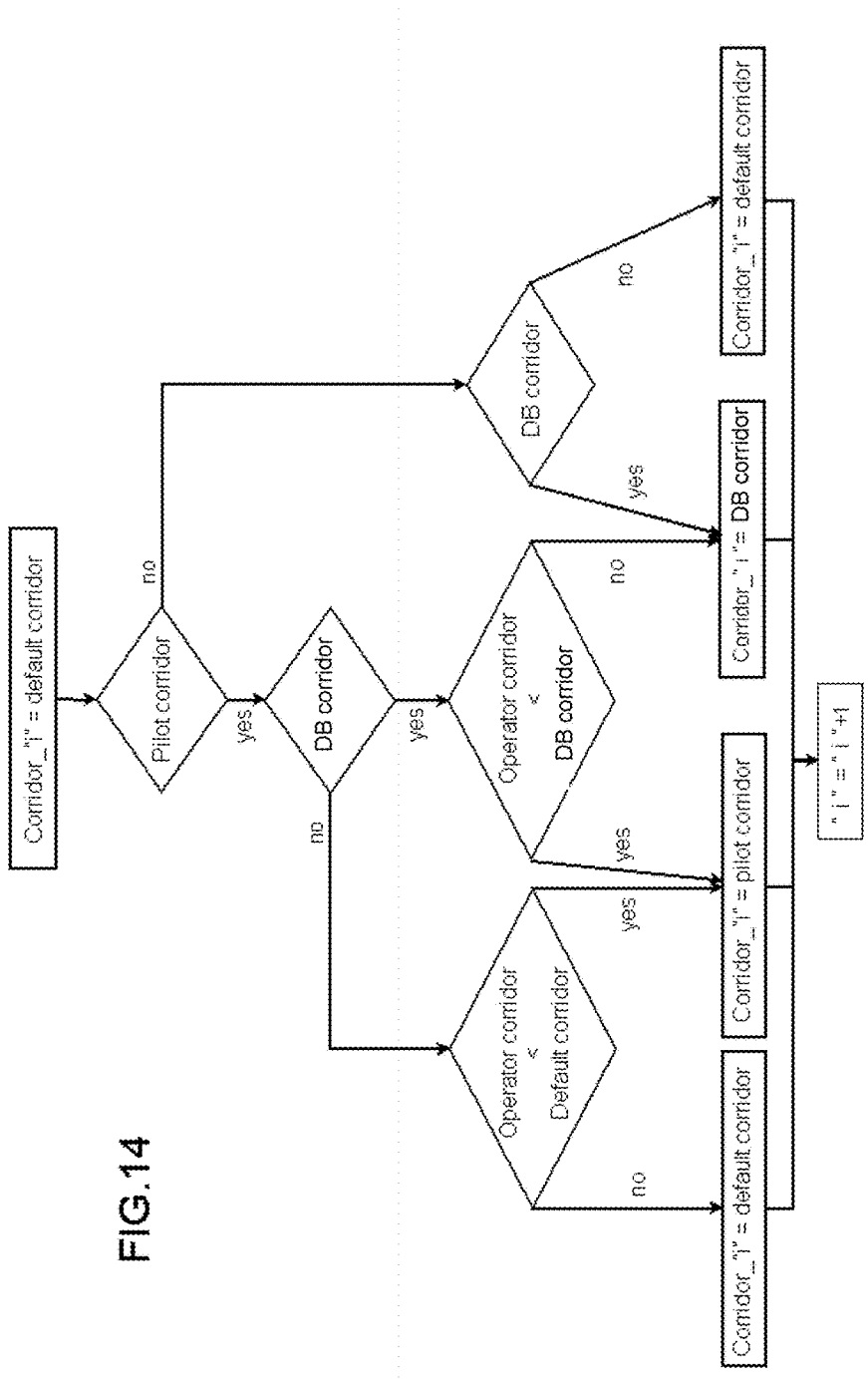
FIG. 14 illustrates the corridor value (Default, Pilot, Database) taken into account for a segment.

When an operator defines a value of corridor width, the latter is applicable on the current segment and on all the other segments of the entire list. However, if a regulation is associated with the navigation performance, it is conveyed through the other options (database navigation, flight area) and may be more constraining than the value entered by the operator. In the state of the art, when the value defined by the operator becomes a value greater than that corresponding to the regulation, the system dispatches a message to the pilot requesting to him to lower the value of the corridor to make it comply with the regulation. Advantageously, with the method of the invention, for a given segment 'i', for the calculation of required performance prediction, the system takes the most constraining contingency, that is to say the value of the half-width of the corridor. The system takes into consideration the corridor defined by the operator only if it is less than that of the regulation. When the corridor is defined for a segment in the database, it corresponds to the required performance regulation for this segment and it is applicable unless the pilot value is more constraining. When neither an operator value, nor a "Database" value exists for a segment, a default corridor value, determined as a function of the geographical flight area (terminal, oceanic enroute, approach), is applied for this segment. Thus, when the corridor is defined for a segment with the default value, it corresponds to the required performance regulation for this segment and it is applicable unless the pilot value is more constraining. FIG. 14 illustrates which corridor value (Default, Pilot, Database) is taken into account for a segment 'i'.

The output (913) of the method of calculating the required navigation performance prediction is the list of the 'N' segments for the whole flight plan associated with the trajectory with, for each segment, the calculated required navigation performance (RPN) prediction.

Thus, the aim of the system for calculating the prediction of the required navigation performance is to define, for each of the segments of the list, the required navigation performance which is applicable that is to say which complies with the regulation.

The calculation of the prediction of required navigation performance is not relaunched in a regular manner or in an automatic manner. The calculation is relaunched subsequent to a modification by the operator of the list of segments (by adding, deleting segments) or subsequent to a modification by the operator of the value of the corridor associated with a segment.

Figure 9C:
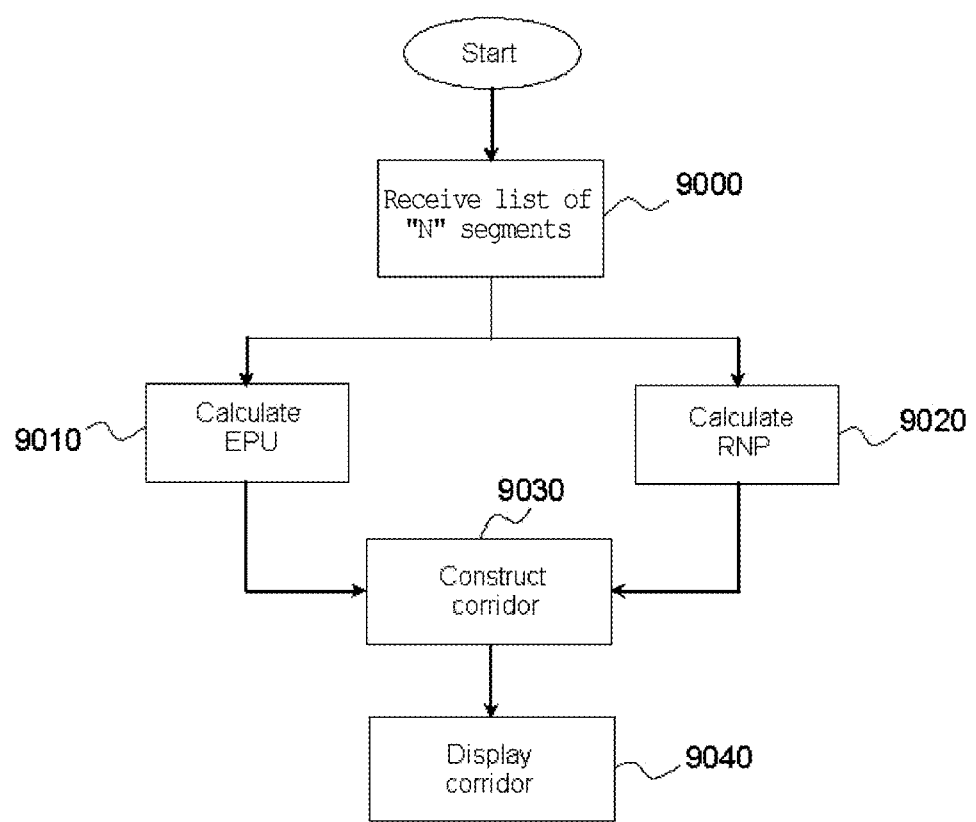
FIG. 9c illustrates the method for constructing a corridor trajectory in an embodiment of the invention.

Advantageously, as illustrated in FIG. 9c, the method implemented by the device of the invention makes it possible to combine the predictions of estimated navigation performance (9010) and required navigation performance (9020) calculated for a list of segments (9000), so as to construct (9030) a navigation corridor trajectory.

Figure 18:
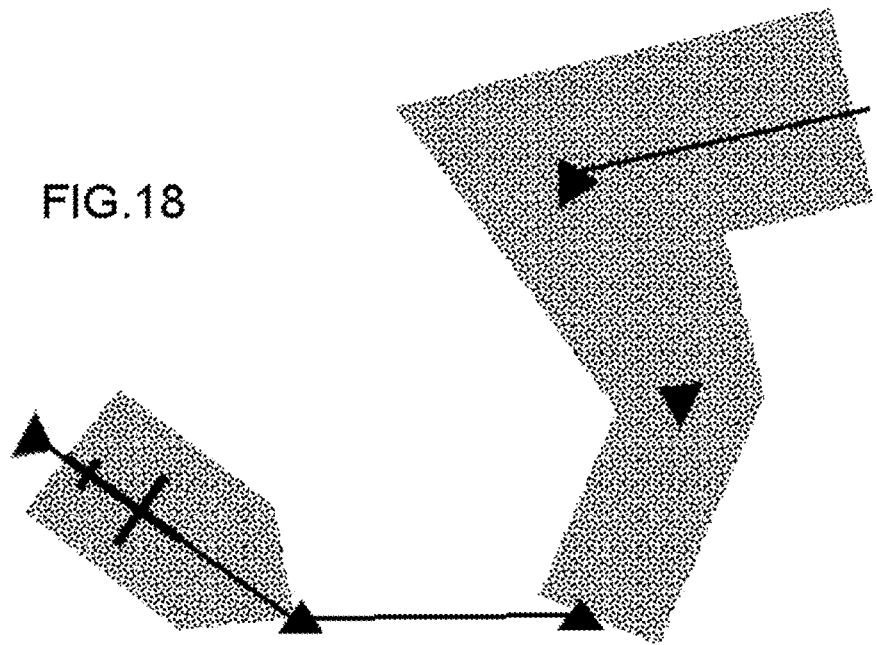

Advantageously, two approaches are proposed for constructing a corridor on the basis of the two types of performance prediction. In a first option, the method makes it possible to subtract the predicted performance from that required, in such a way that it can never exceed the required contingency, whatever the position of the aeroplane in this corridor. The advantage of this solution is that if a degradation in navigation performance occurs, it is progressive and visible to the operator. The display resulting from this approach is illustrated in FIG. 18.

Figure 19:
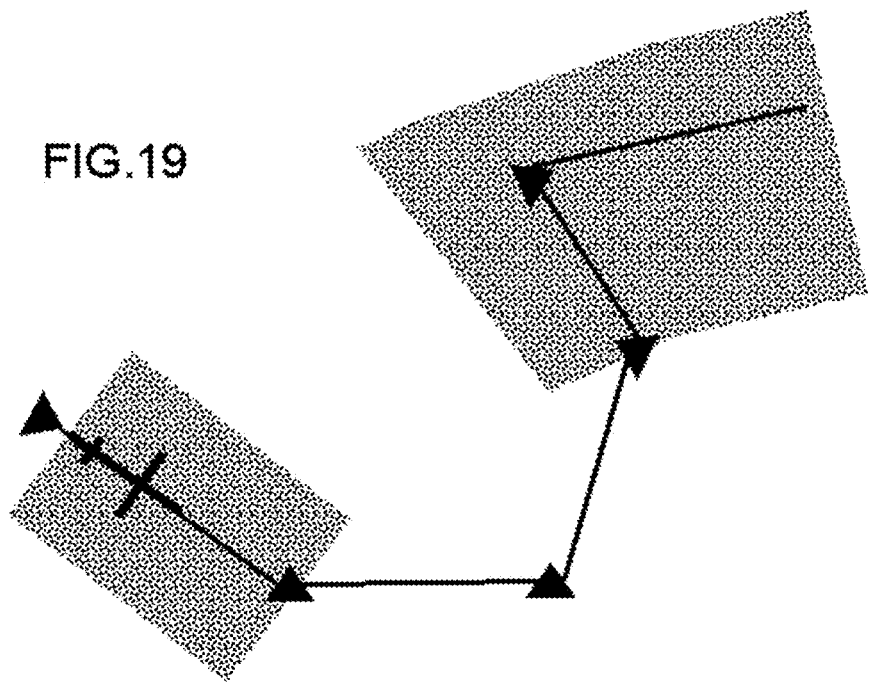

An alternative approach for constructing a corridor is to consider a corridor of width "1×corridor" when the predicted performance is strictly below the required performance. If the predicted performance is greater than or equal to the required performance, the strip becomes a wire. In this case the guarantee is not to remain inside the corridor but to guarantee never to cross the corridor twice as wide, this being the major safety objective. The advantage of this solution is that the corridor wherein the aircraft can fly is wider. The display resulting from this approach is illustrated in FIG. 19.

Figure 20:
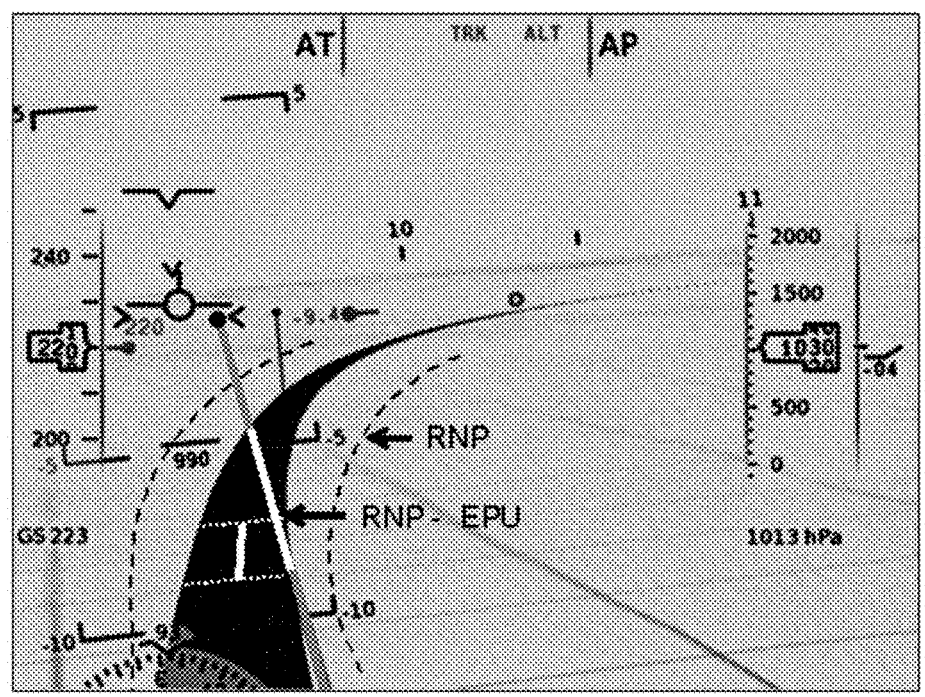

According to diverse embodiments, the corridor can be displayed (9040) on demand on a screen for the pilot in the form of a "strip" trajectory according to different variants illustrated by FIGS. 15 to 20. The display device can be a conventional screen of the cockpit such as a "Navigation Display" (ND) or a "Primary Flight Display" (PFD) screen with a "Synthetic Visual System" (SVS) capability such as represented in FIG. 20. For a ground operator, this information can be displayed on a screen of the control post.

Figure 15:
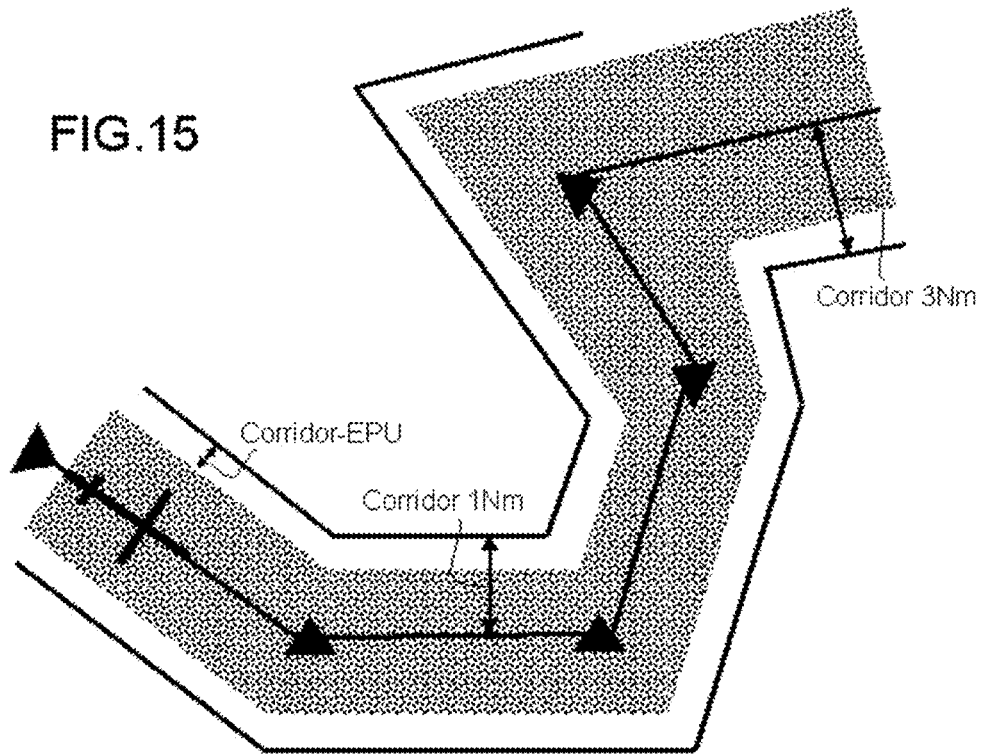
FIGS. 15 to 20 illustrate different variants of display of the predictions of required and estimated navigation performance.
Figure 16:
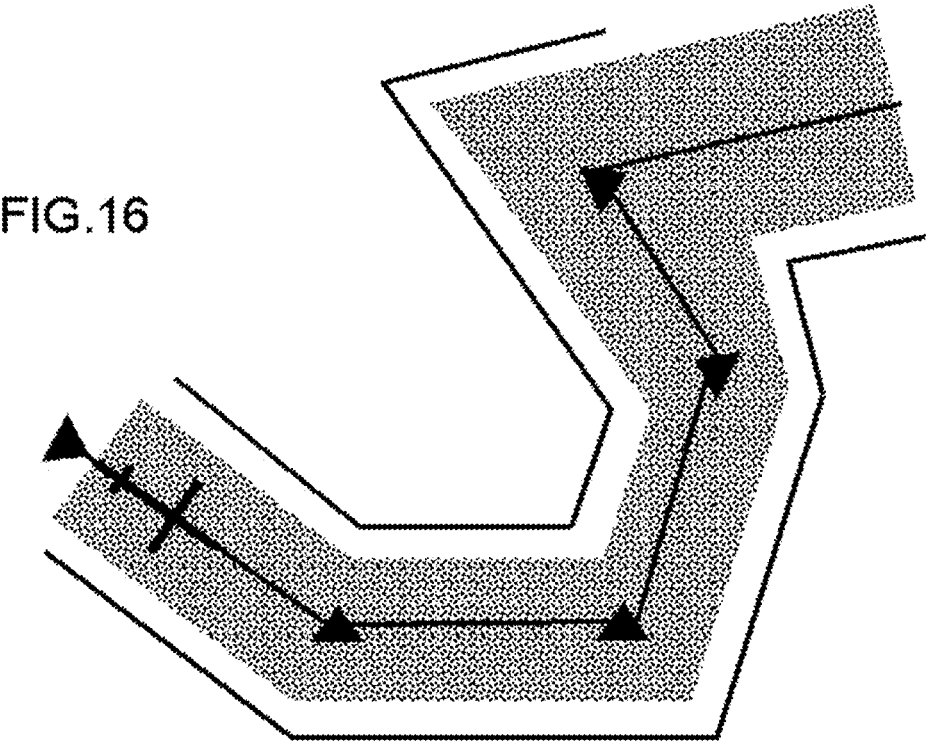
Figure 17:
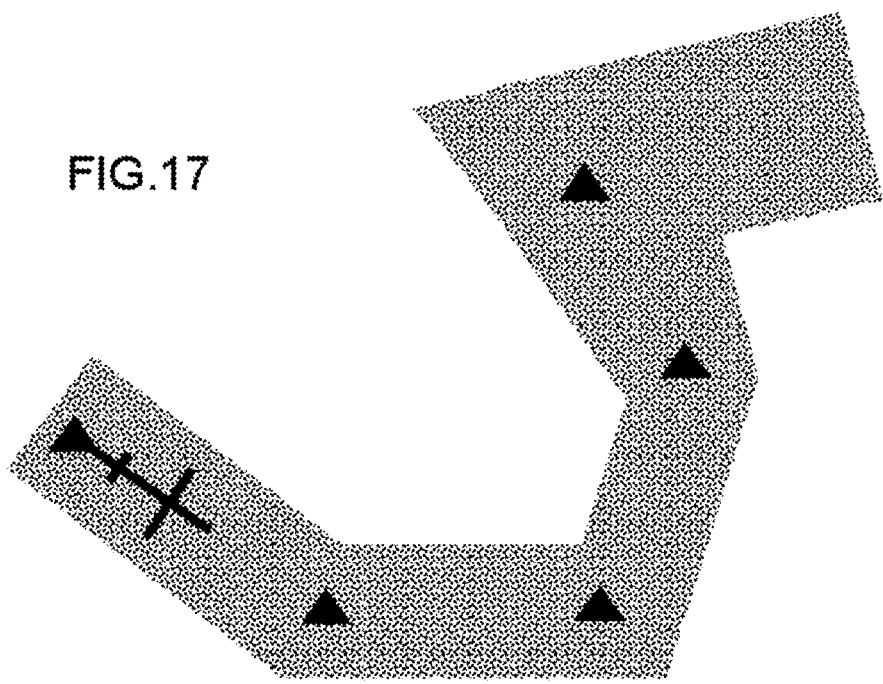

The "strip" trajectory is constructed in such a way as to never exit the contingency (width of the corridor) with respect to the reference trajectory corresponding to the list of initial segments of the flight plan, illustrated in FIGS. 15 and 16. In so far as a corridor is defined, just representing the points of the segments without drawing the wire which joins them is another exemplary representation proposed in FIG. 17.

If on a segment, the predicted performance is greater than the required performance, the corridor again becomes a wire on the segment. In an optional manner, an alert message may be dispatched to the operator when this segment will soon become the active segment, stated otherwise when this segment is close to the start of the list of segments.

Thus, the pilot can choose whether or not to display:
the predictions of required navigation performance of the segments;
the predictions of estimated navigation performance of the segments;
the corridor resulting from the combination of the 2 predictions.

In an optional manner, in case of multiple flight plan display, all the displays can be temporarily disabled automatically or manually.

Figure 11:
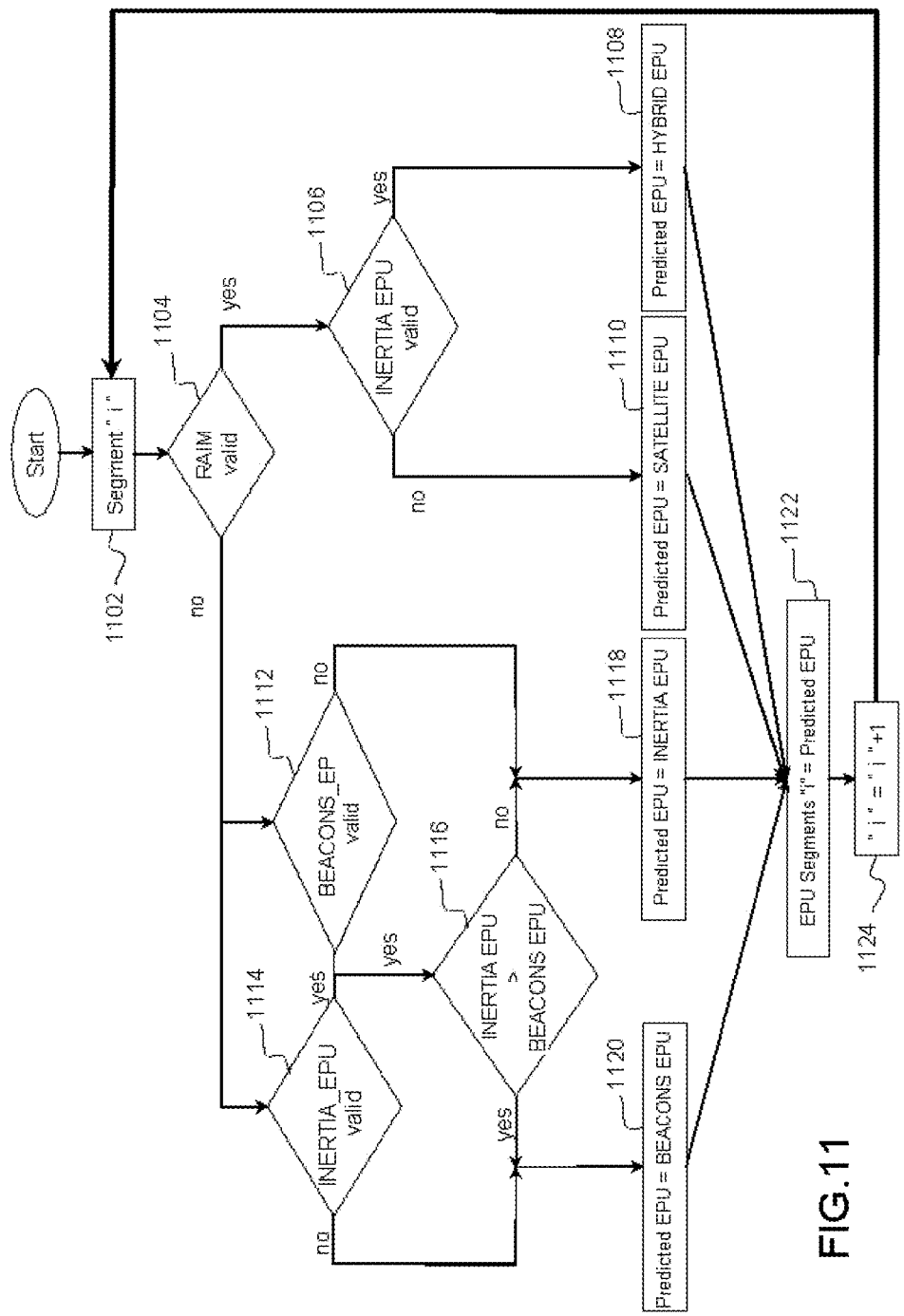
FIG. 11 illustrates the method for calculating the EPU prediction for a segment in an embodiment of the invention.

FIG. 11 illustrates the step of calculating the estimated navigation performance EPU prediction for a segment 'i' of the list (step 908 of FIG. 9a).

The method is described here for the calculation of the prediction of estimated horizontal navigation performance, however the person skilled in the art will transpose the principles of the method to the calculation of the prediction of estimated vertical navigation performance.

Advantageously, the method uses functionalities of the satellite reception systems embedded aboard the aircraft for monitoring the satellites and detecting faulty satellites. In particular, the method uses a capability of these systems to predict the availability of the satellites for a given date and a given place, this functionality being termed "RAIM" for "Reliability, Availability and Integrity Monitoring". Receivers equipped with RAIM technology are able to predict the integrity of the GPS positioning signals received from the satellites and able through a function termed "FDE" for "Fault Detection and Exclusion" to detect faulty satellites and exclude them from the aircraft position calculation.

The estimated navigation performance prediction is related to the number and to the position of the satellites available at a given time.

The method is iterative and operates segment after segment (1102, 1124). For a segment 'i' (1102), the method makes it possible to determine (1104) whether the satellite prediction is precise and available by using the RAIM functionality. In the positive case, for any segment where the satellite prediction is precise and available, the method makes it possible to establish the estimated navigation performance prediction as a function of the value of the predicted satellite performance, named "SATELLITE_EPU" (1110).

To increase its precision, the method makes it possible to combine the satellite information (1104) with the information (1106) of the systems based on inertial platforms (IRS, AHRS, etc.), for example to cover the cases where the satellite system gives an aberrant value of aircraft position (due for example to a transient loss of satellites). The inertial system will then passivate this response. Indeed, the inertial system drifts slowly and the aircraft position of the satellite system which is precise in the long term will passivate this drift by allowing the inertial system to reset itself. The satellite system provides the value of its performance (1104) and through the use of the inertial system (1106) the method makes it possible to consolidate this value and calculate a prediction of estimated navigation performance named "HYBRID_EPU" (1108).

Figure 12:
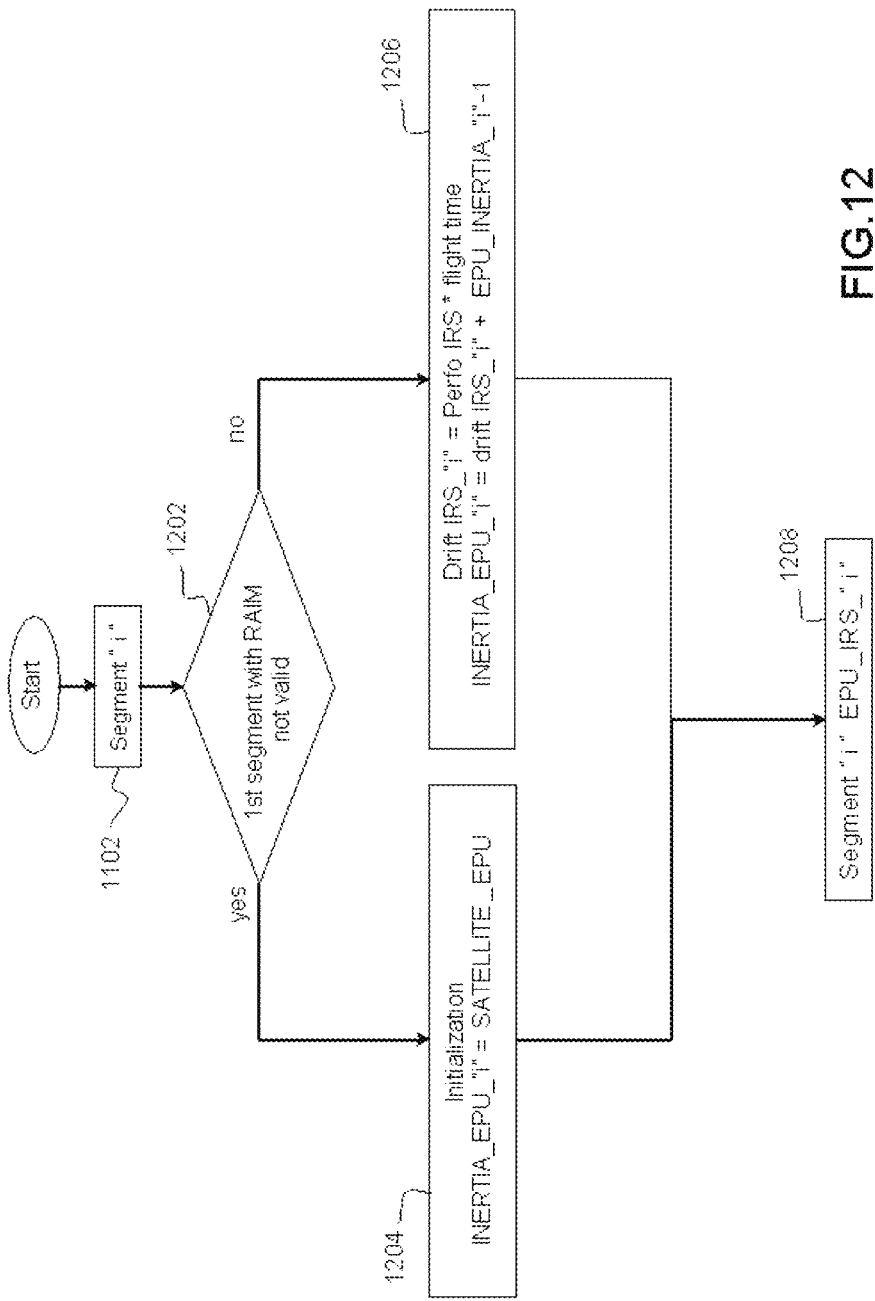
FIG. 12 illustrates the method for calculating the EPU-inertia prediction for a segment in an embodiment of the invention.

Returning to the initial step (1104), if on a segment 'i' the satellite system is not available or exhibits unsuitable performance with respect to the required navigation performance (No branch), the method makes it possible to take into account the performance information provided by the other positioning systems—beacons and inertial systems. The method makes it possible to calculate (1112) the estimated navigation performance named BEACONS_EPU associated with the types of beacons available around the segment 'i' which do not have any satellite information (no RAIM), and makes it possible to calculate (1114) the estimated navigation performance, named INERTIA_EPU, associated with the inertial systems, while taking account of the inertial drift over the "no RAIM" segment 'i'. Next, the method makes it possible to compare (1116) the BEACONS_EPU and INERTIA_EPU values and to take the value (1118, 1120) corresponding to the best performance. As described, the method calculates the BEACONS_EPU value (1112) only upon non-availability of the RAIM capability Accordingly, the system searches for whether any radio navigation beacons (VOR, TACAN, DME, LOC, ILS, MLS, etc.) exist in the geographical zone of the "no RAIM" segment 'i'. If such is the case, the method calculates the estimated performance associated with the beacons as a function of the available beacons. For example, the BEACONS_EPU is of the order of 4 Nm for VOR beacons whilst it may be of the order of 0.3 Nm for DME beacons. The BEACONS_EPU for segment 'i' is compared (1116) with the INERTIA_EPU of the same segment 'i', the calculation of which is described hereinafter. In a similar manner, the method calculates the value of the INERTIA_EPU (1114) only upon non-availability of the RAIM capability. The inertial systems (IRS, AHRS) have a value of INERTIA_EPU that can vary over time because of their intrinsic drift which is of the order of 2 Nm to 4 Nm per hour depending on the performance of the systems and in the absence of resetting through the satellite position. When the RAIM capability becomes unavailable for a first segment 'i' (1202), such as described with reference to FIG. 12 the method initializes (1204) the INERTIA_EPU_i of this segment with the last value of the SATELLITE_EPU. After a first RAIM non-availability, for the following segments which have a RAIM unavailable capability (no branch, 1206), the INERTIA_EPU of the corresponding segment 'i' is the INERTIA_EPU of segment 'i−1', increased by the drift of the inertial system which is proportional to the traversal time for segment 'i'. An estimation of the drift can be carried out in a linear manner along the segment. Such an operation can be continued in an iterative manner as long as the value of the INERTIA_EPU of the segment remains less than that of the BEACONS_EPU.

Thus for each segment 'i' of the list, the method calculates (1122) a value of EPU of the "EPU predicted" segment, and iterates over the following segment 'N+1' (1124) so as to generate a list of 'N' segments with an estimated navigation performance prediction calculated for each segment (910).

Generally, the EPU has a value dependent on the positioning systems available. By way of example, the satellite system makes it possible to attain SATELLITE_EPU values (1110) of the order of 0.1 Nm.

Advantageously, the method makes it possible to determine whether the length of a segment of the list is too long, in regard to the configuration of the satellites or the presence of ground beacons. In such a case, the method makes it possible to cut the segment into several sub-segments of fixed length, so as to obtain a suitable predicted performance value. A maximum segment length can be fixed, as equal to 100 Nm for example. In an alternative, another scheme for cutting an overly long segment is to use the RAIM response which in the current systems gives the "RAIM" state for −15 min, −5 min, 0 min, +5 min and +15 min with respect to the position of the segment.

Figure 13:
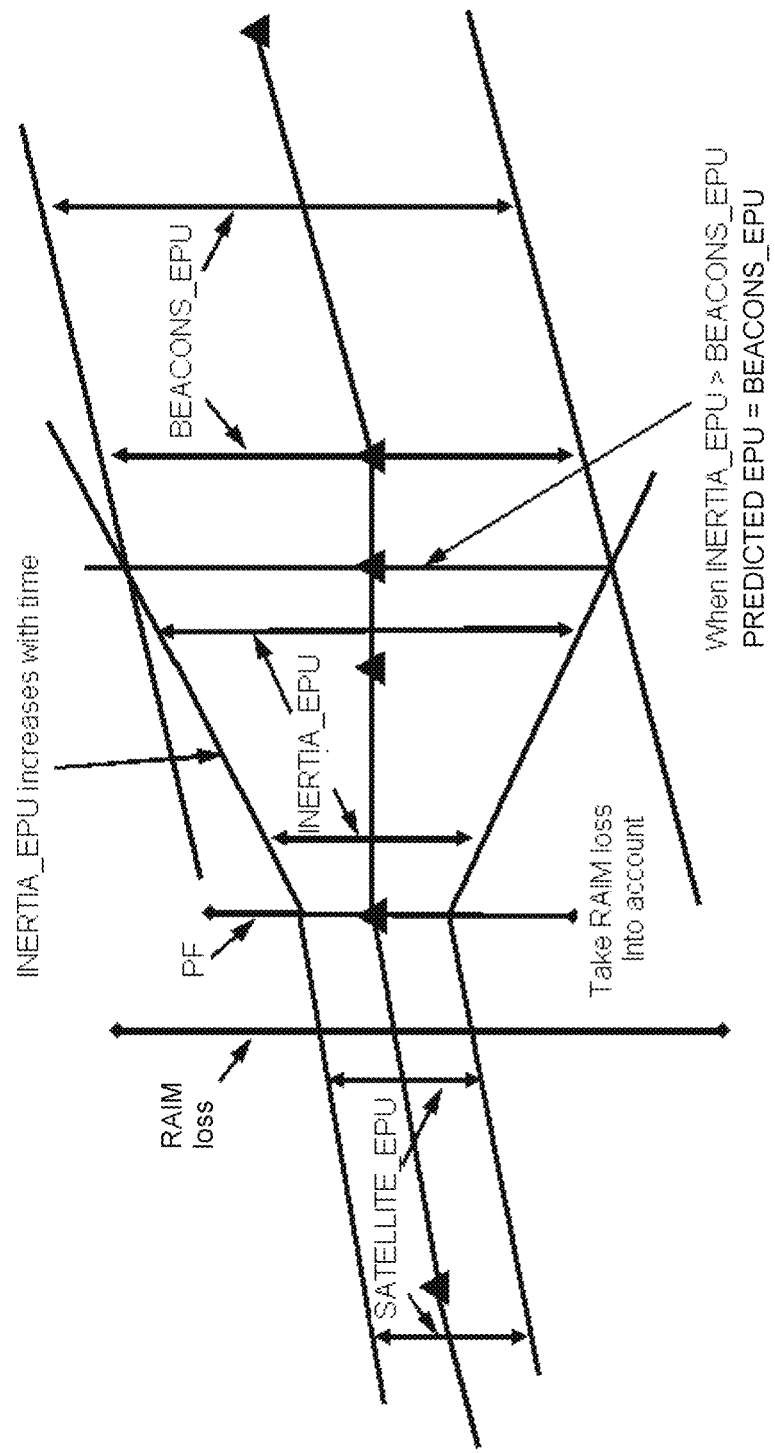
FIG. 13 illustrates the type of EPU considered for segments as a function of the availability or of the loss of RAIM functionality.

FIG. 13 illustrates the type of EPU considered for several segments as a function of the availability or otherwise of the RAIM functionality. Before the RAIM loss, the prediction provided is based on the SATELLITE_EPU. After the RAIM loss, at the next final point (PF), the prediction provided is based on the INERTIA_EPU as long as it is less than the BEACONS_EPU and becomes based on the BEACONS_EPU after the next final point where it becomes greater than the latter.

Although the methods for calculating the prediction of required and estimated navigation performance have been described for a prediction of horizontal navigation performance, a corresponding calculation of the navigation performance prediction can be applied to the vertical axis of the trajectory of an aircraft.

Just as for the horizontal axis, there exists on the vertical axis, the "Total System Error" (TSEz) in z (vertical axis) which represents the error in the calculation of the vertical position, stated otherwise the altitude of an aircraft. This error, represented in FIG. 21, has three components, and is expressed by the following equation:

$$TSE_z = \sqrt{(FTE_z)^2 + (HCE)^2 + (ASE)^2}$$

where

"Flight Test Error vertical" (FTEz) corresponds to the aircraft's vertical guidance error in manual or automatic mode;

"Horizontal coupling Error" (HCE) corresponds to the error induced by the lateral error (horizontal coupling error); and "Altimetry System Error" (ASE) corresponds to the error of the altimetry system in the calculation of the altitude of the aircraft on the basis of the radio position, inertial, or satellite sensors.

Regulatory requirements exist which relate to the disparity between a reference vertical profile and the aircraft, of the order of 250 ft at high altitude, and of the order of 150 ft at low altitude. These requirements which define the required vertical performance are the inputs for the calculation of the required vertical performance prediction and can be represented in the form of a vertical corridor.

According to the same principle as for the calculation of the horizontal performance prediction, the method for calculating the vertical performance prediction takes into account the various vertical-positioning systems with their associated precision. The principal known systems are satellite positioning systems (e.g.: GPS, GLONASS, etc.), systems based on barometric pressure or radio (Air Data Computer ADC, Radio Altimeter RA) and inertia-based navigation systems (e.g.: IRS, ADIRS, AHRS, etc.). By taking account of the vertical-position trackers, an estimation of the vertical performance is established as a function of the available trackers. This estimation is the basis of the estimated vertical performance prediction calculation.

The method for calculating the predictions of required and estimated performance makes it possible to construct a vertical navigation corridor which can be displayed on demand on a screen for the pilot. The vertical "strip" profile is constructed in such a way as to never exit the vertical contingency "2× the width of the corridor" (twice the disparity tolerance) with respect to the reference vertical profile corresponding to the list of segments.

Figure 21:
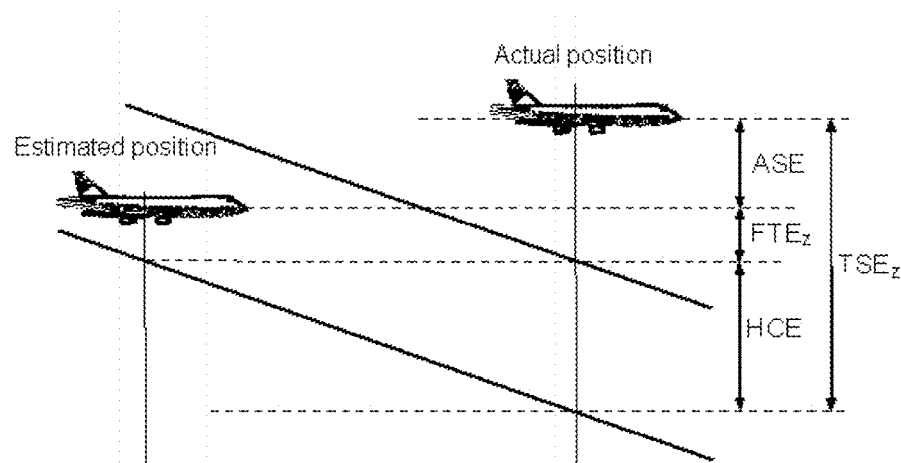
FIG. 21 illustrates the three components of the error in calculating the aircraft vertical position.
Figure 22:
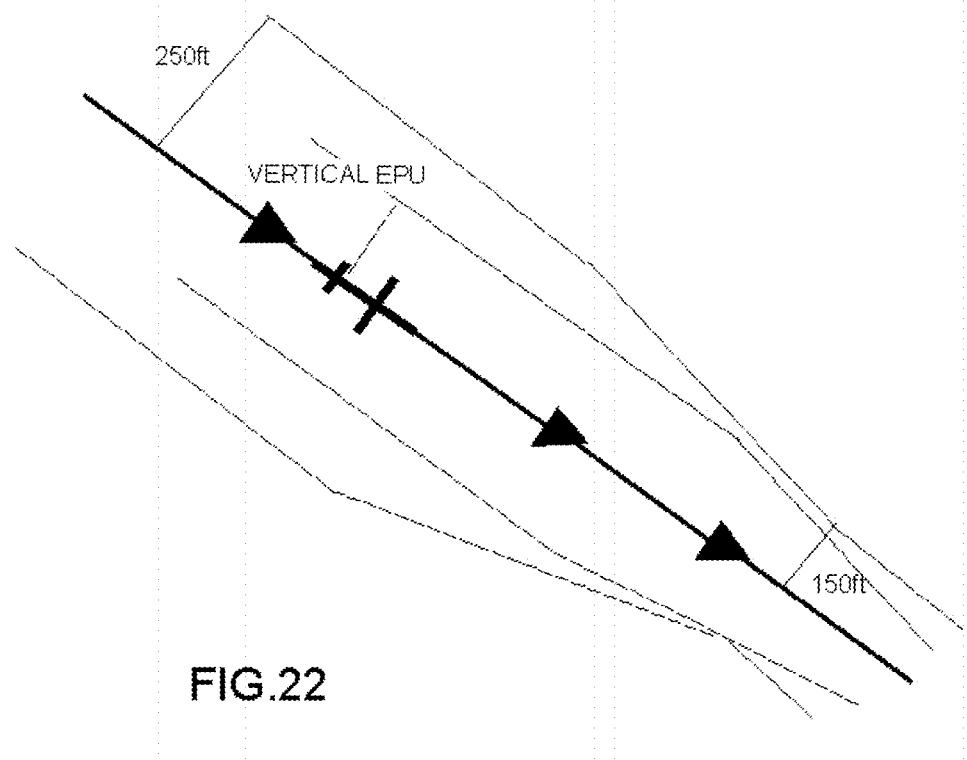
FIGS. 22 and 23 illustrate variants of vertical corridor display.
Figure 23:
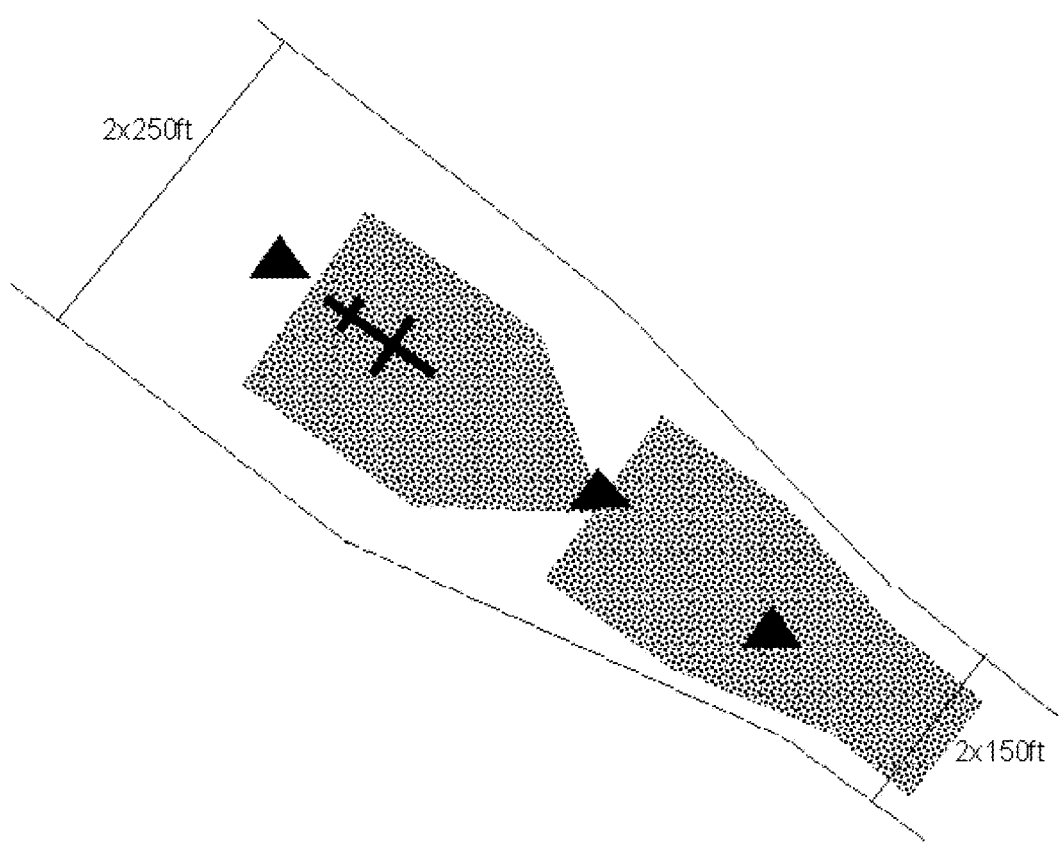

FIGS. 22 and 23 illustrate variants of vertical corridor display on a "Vertical display" (VD) or on a "Primary Flight Display" (PFD) having a "Synthetic Visual System 3D" (SVS 3D). The system can display the vertical strip profile for the required and estimated predictions based on dashed lines as illustrated in FIG. 21. Another proposal for display of this strip trajectory by the display system is provided by FIG. 22.

According to one mode of implementation, the method for calculating the estimated and required predictions on a list of segments is carried by a specific partition of an avionics-specific hardware platform different from that of the FMS. According to another preferred embodiment, this calculation is performed on the execution platform of the FMS, by components suitable for the calculations. Indeed, the advent of integrated modular avionics on recent aircraft has allowed the definition of execution platforms and platforms for digital communication between the functions. This trend has however given rise to an increase in complexity—in particular the internal complexity of the functions but also the complexity of the avionics system configuration process—and growing needs in respect of performance and optimization of resources. In this context, the new hardware platforms are endowed with capabilities in respect of management (operations, safety and maintenance), energy optimization and location, which go beyond the standard functions of known platforms. According to another aspect, the invention relates to a non-transitory computer program product comprising code instructions adapted to perform the steps of the method according to the invention. The method can be implemented on the basis of hardware elements and/or software elements. The method can be available in the guise of computer program product on a computer-readable medium. The method can be implemented on a system that can use one or more dedicated electronic circuits or a general-purpose circuit. The technique of the method according to the invention can be carried out on a reprogrammable calculation machine (a processor or a microcontroller for example) executing a program comprising a sequence of instructions, or on a dedicated calculation machine (for example a set of logic gates such as an FPGA or an ASIC, or any other hardware module). The various modules of the system according to the invention can be implemented on one and the same processor or on one and the same circuit, or distributed over several processors or several circuits. The modules of the system according to the invention consist of calculation means including a processor. The reference to a computer program which, when it is executed, performs any one of the previously described functions, is not limited to an application program executing on a single host computer. On the contrary, the terms computer program and software are used here in a general sense to refer to any type of computer code (for example, application software, microsoftware, microcode, or any other form of computer instruction) which can be used to programme one or more processors so as to implement aspects of the techniques described here.

The invention claimed is:

1. A method of calculating estimated navigation performance prediction for a trajectory of an aircraft, the method being operated by an aircraft computing platform and comprising the steps of:
   receiving a list of segments comprising all of the segments of a flight plan with a prediction of a transit time associated with each segment;
   for each segment of the list:
      identifying the positioning systems outside the aircraft that are available in the geographical zone of the said segment;
      determining the performance values of the positioning systems identified and selecting the outside positioning system exhibiting the lowest navigation performance calculation error for the position of the said segment and the said predicted transit time; and
      calculating an estimated navigation performance prediction, on the basis of data arising from the outside positioning system selected; and
   updating the list of segments with the estimated navigation performance prediction associated with each segment.

2. The method according to claim 1, wherein the step of identifying the positioning systems consists in identifying all of the satellite, beacon and inertial positioning systems available for the said segment.

3. A device for the calculation of estimated navigation performance prediction for a trajectory of an aircraft, the device comprising:
   means for receiving a list of segments comprising all of the segments of a flight plan with a prediction of a transit time associated with each segment;
   means adapted, for each segment of the list:
      to identify the positioning systems outside the aircraft that are available in the geographical zone of the said segment;
      to determine the performance values of the positioning systems identified and select the outside positioning system exhibiting the lowest navigation performance calculation error for the position of the said segment and the said predicted transit time;
      to calculate an estimated navigation performance prediction, on the basis of data arising from the outside positioning system selected; and means for updating the list of segments with the estimated navigation performance prediction associated with each segment, wherein the device is configured to operate the steps of the method according to claim 2.

4. The method according to claim 1, wherein the step of calculating the estimated navigation performance prediction consists in determining whether a satellite prediction for the said segment is precise and available, and, if so, calculating the estimated navigation performance prediction on the basis of the satellite data.

5. The method according to claim 4, comprising, if the satellite prediction for the said segment is not precise or unavailable, a step of comparing the performance values of beacon and inertial systems and calculating the estimated navigation performance prediction on the basis of the data of the beacon or inertial positioning system exhibiting the lowest navigation performance calculation error for the said segment.

6. The method according to claim 5, wherein the calculation of the estimated navigation performance prediction, when it is done on the basis of the data of the inertial system, takes into account the drift of the inertial system.

7. The method according to claim 5, wherein the calculation of the estimated navigation performance prediction, when it is done on the basis of the data of the beacon system, takes into account the performance of the beacons available in the geographical zone of the said segment.

8. The method according to claim 1, wherein the values of navigation performance of the satellite positioning systems arise from a satellite receiver comprising a "RAIM" functionality embedded aboard the aircraft.

9. The method according to claim 1, further comprising a step of cutting the said segment into sub-segments so as to perform the prediction calculation, the said cutting being able to be done according to fixed sub-segment lengths or by considering the maximum range of the satellite predictions.

10. The method according to claim 1, wherein the steps are executed for a calculation of estimated horizontal navigation performance prediction and/or for a calculation of estimated vertical navigation performance prediction.

11. The method according to claim 1, wherein the steps are re-executed automatically if transit time predictions or the flight plan change.

12. A tangible non-transitory computer program product, comprising code instructions that perform the steps of the method according to claim 1, when the tangible non-transitory program is executed on a computer.

13. A method of displaying predictions of estimated and required navigation performance for a trajectory of an aircraft, the method being operated by an aircraft computing platform and comprising the steps of:
calculating predictions of estimated navigation performance for a list of segments of a flight plan, according to the steps of the method of claim 1;
calculating, for the same list of segments, predictions of required navigation performance; and
representing the said predictions of estimated and required navigation performance graphically on a display means.

14. The method according to claim 13, wherein the step of calculating the predictions of required navigation performance comprises the steps of:
receiving a list of segments of a flight plan;
for each segment of the list:
identifying all the contingencies constituting navigation performance constraints;
determining and selecting the most constraining contingency for the said segment;
calculating a prediction of required navigation performance, as a function of data arising from the selected contingency; and
updating the list of segments with the prediction of required navigation performance associated with each segment.

15. The method according to claim 13, wherein the graphical representation consists in displaying the said predictions of estimated and required navigation performance superimposed on a wire trajectory.

16. The method according to claim 13, comprising, before the display step, a step consisting for each segment in subtracting the predictions of estimated navigation performance from the predictions of required navigation performance, so as to construct a corridor trajectory, and wherein the graphical representation consists in displaying the said predictions of estimated and required navigation performance as a function of the corridor.

17. The method according to claim 16, wherein the display step consists in displaying a wire trajectory for the segments having a greater estimated navigation performance prediction than the required navigation performance prediction.

18. The method according to claim 16, wherein the graphical representation consists in representing the navigation latitude in contrast on the corridor trajectory.

19. A device for displaying predictions of estimated and required navigation performance for a trajectory of an aircraft, the display device comprising a display means and calculation means adapted to calculate predictions of estimated and required navigation performance, the predictions of estimated navigation performance being calculated according to the steps of the method of claim 1, the device further comprising means for representing the said predictions of estimated and required navigation performance graphically on the said display means.

20. The display device according to claim 19, wherein the display means is a screen of the cockpit of the aircraft, such as a "Navigation Display" (ND) or a "Primary Flight Display" (PFD) screen.

21. A device for the calculation of estimated navigation performance prediction for a trajectory of an aircraft, the device comprising:
means for receiving a list of segments comprising all of the segments of a flight plan with a prediction of a transit time associated with each segment;
means adapted, for each segment of the list:
to identify the positioning systems outside the aircraft that are available in the geographical zone of the said segment;
to determine the performance values of the positioning systems identified and select the outside positioning system exhibiting the lowest navigation performance calculation error for the position of the said segment and the said predicted transit time;
to calculate an estimated navigation performance prediction, on the basis of data arising from the outside positioning system selected; and
means for updating the list of segments with the estimated navigation performance prediction associated with each segment.

22. An embedded flight management system or computer of EFB type comprising a device for calculating estimated navigation performance prediction for a trajectory of an aircraft according to claim 21.

* * * * *